(12) United States Patent  
Kondo et al.

(10) Patent No.: US 8,213,510 B2  
(45) Date of Patent: *Jul. 3, 2012

(54) MOTION VECTOR CODING AND DECODING METHODS

(75) Inventors: Satoshi Kondo, Yawata (JP); Shinya Kadono, Nishinomiya (JP); Makoto Hagai, Moriguchi (JP); Kiyofumi Abe, Kadoma (JP)

(73) Assignee: Panasonic Corporation, Osaka (JP)

( * ) Notice: Subject to any disclaimer, the term of this patent is extended or adjusted under 35 U.S.C. 154(b) by 1280 days.
This patent is subject to a terminal disclaimer.

(21) Appl. No.: 11/980,622

(22) Filed: Oct. 31, 2007

(65) Prior Publication Data

US 2008/0069236 A1 Mar. 20, 2008

Related U.S. Application Data

(63) Continuation of application No. 10/473,322, filed as application No. PCT/JP03/04540 on Apr. 10, 2003, now Pat. No. 7,394,853.

(30) Foreign Application Priority Data

Apr. 23, 2002 (JP) ................................ 2002-121051  
Jun. 14, 2002 (JP) ................................ 2002-173865

(51) Int. Cl.  
*H04N 7/12* (2006.01)  
*H04N 11/02* (2006.01)  
*H04N 11/04* (2006.01)  
*H04B 1/66* (2006.01)

(52) U.S. Cl. .................................................. 375/240.16

(58) Field of Classification Search .................... None  
See application file for complete search history.

(56) References Cited

U.S. PATENT DOCUMENTS

| | | | |
|---|---|---|---|
| 5,412,430 A | 5/1995 | Nagata | |
| 5,905,535 A | 5/1999 | Kerdranvat | |
| 5,926,225 A | 7/1999 | Fukuhara et al. | |
| 5,978,048 A | 11/1999 | Lee | |

(Continued)

FOREIGN PATENT DOCUMENTS

EP 0 526 163 2/1993

(Continued)

OTHER PUBLICATIONS

International Search Report issued Aug. 5, 2003 in the International (PCT) Application of which the present application is the U.S. National Stage.

(Continued)

*Primary Examiner* — Nhon Diep  
(74) *Attorney, Agent, or Firm* — Wenderoth Lind & Ponack, L.L.P.

(57) ABSTRACT

A motion vector coding method and apparatus that improves efficiency of coding motion vectors when a current block is coded using a plurality of motion vectors. The apparatus includes a motion vector coding unit that codes a motion vector inputted from a motion vector detecting unit. A motion vector for each current block is coded based on a difference between the motion vector and a predicted vector obtained from motion vectors for previously coded neighboring blocks. The predicted vector is generated by one of the following processes: (A) the motion vectors which refer to the same picture are selected from among the motion vectors for the neighboring blocks so as to generate the predicted vector; (B) the motion vectors for the respective neighboring blocks are ordered in the predetermined order, and the motion vectors of the same order rank are selected from the ordered motion vectors so as to generate the predicted vector; and (C) the predicted vector for the second motion vector of the current block shall be the first motion vector, and if the second motion vector and the first motion vector refer to different pictures, the first motion vector is scaled according to the temporal distance between the pictures so as to generate the predicted vector.

3 Claims, 16 Drawing Sheets

| | block A | block B | block C | block D |
|---|---|---|---|---|
| First motion vector (MV1) | forward (P7) | forward (P7) | forward (P7) | forward (P7) |
| Second motion vector (MV2) | forward (P4) | forward (P4) | forward (P4) | forward (P4) |

| | block A | block B | block C | block D |
|---|---|---|---|---|
| First motion vector (MV1) | forward (P7) | forward (P7) | forward (P7) | forward (P7) |
| Second motion vector (MV2) | forward (P1) | forward (P4) | forward (P1) | forward (P4) |

U.S. PATENT DOCUMENTS

| | | | | |
|---|---|---|---|---|
| 6,816,552 B2 * | 11/2004 | Demos | ................... | 375/240.15 |
| 6,825,885 B2 | 11/2004 | Bottreau et al. | | |
| 6,862,320 B1 | 3/2005 | Isu et al. | | |
| 6,961,379 B2 * | 11/2005 | Weitbruch et al. | ....... | 375/240.16 |
| 7,266,150 B2 * | 9/2007 | Demos | ................... | 375/240.15 |
| 7,308,029 B2 * | 12/2007 | Boice et al. | ............. | 375/240.15 |
| 2003/0128762 A1 | 7/2003 | Nakagawa et al. | | |

FOREIGN PATENT DOCUMENTS

| | | |
|---|---|---|
| EP | 0 944 245 | 9/1999 |
| JP | 5-37915 | 2/1993 |
| JP | 08-251601 | 9/1996 |

OTHER PUBLICATIONS

H.26L Test Model Long Term Number 6(TML-6) draft.0. [Online], ITU-Telecommunications Standardization Sector Study Group 16 Video Coding Experts Group (VCEG), 2001. [retrieved on May 28, 2003], pp. 28-33, especially p. 32.

Takahiro Fukuhara et al., "*Very Low Bit-Rate Video Coding with Block Partitioning and Adaptive Selection of Two Time-Differential Frame Memories*", IEEE Transactions on Circuits and Systems for Video Technology, IEEE Service Center, Piscataway, NJ, US, vol. 7, No. 1, Feb. 1997, XP01001439.

"*Working Draft No. 2, Revision 2 (WD-2)*", Document JVT-B118R2, Jan. 29, 2002, pp. 1-10, XP001086630.

Faouzi Kossentini et al., "*Predictive RD Optimized Motions Estimation for Very Low Bit-Rate Video Coding*", IEEE Journal on Selected Areas in Communications, IEEE Service Center, Piscataway, US, vol. 15, No. 9, Dec. 1997, XP011054728.

European Supplemental Search Report dated Jul. 26, 2006 issued in European Application No. EP 03719091.

* cited by examiner

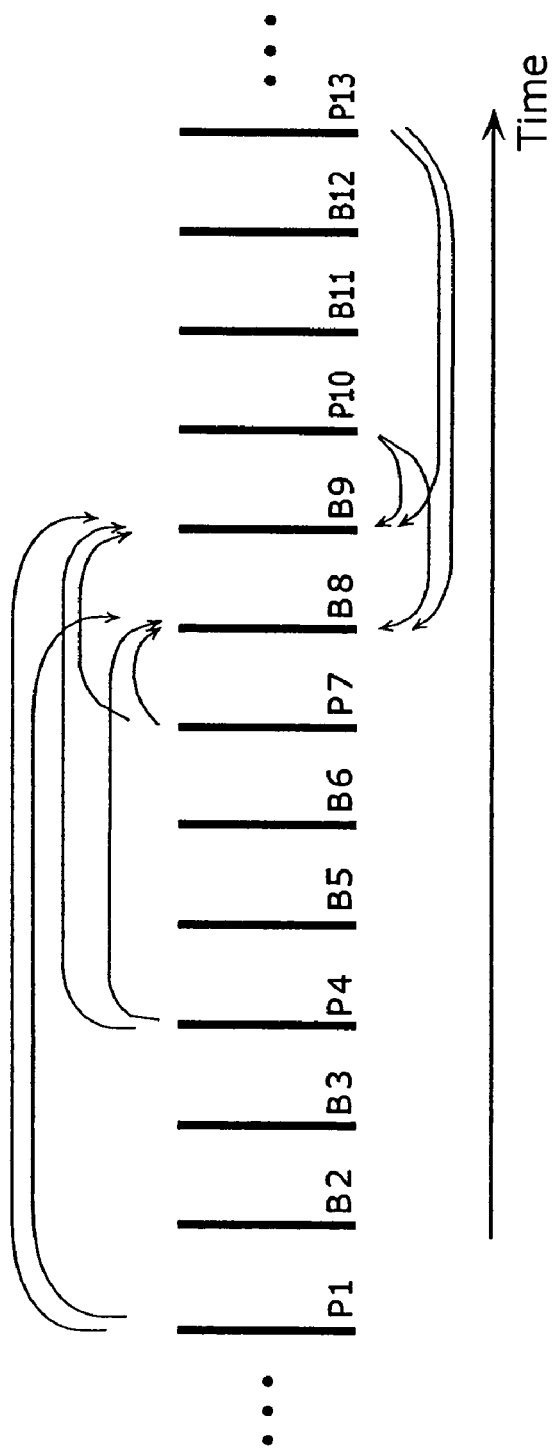

Fig. 4A

|  | block A | block B | block C | block D |
|---|---|---|---|---|
| First motion vector (MV1) | forward (P7) | forward (P7) | forward (P7) | forward (P7) |
| Second motion vector (MV2) | forward (P4) | forward (P4) | forward (P4) | forward (P4) |

Fig. 4B

|  | block A | block B | block C | block D |
|---|---|---|---|---|
| First motion vector (MV1) | forward (P7) | forward (P7) | forward (P7) | forward (P7) |
| Second motion vector (MV2) | forward (P1) | forward (P4) | forward (P1) | forward (P4) |

Fig. 4C

|  | block A | block B | block C | block D |
|---|---|---|---|---|
| First motion vector (MV1) | forward (P7) | forward (P7) | forward (P7) | forward (P7) |
| Second motion vector (MV2) | forward (P4) | forward (P4) | forward (P4) | forward (P4) |

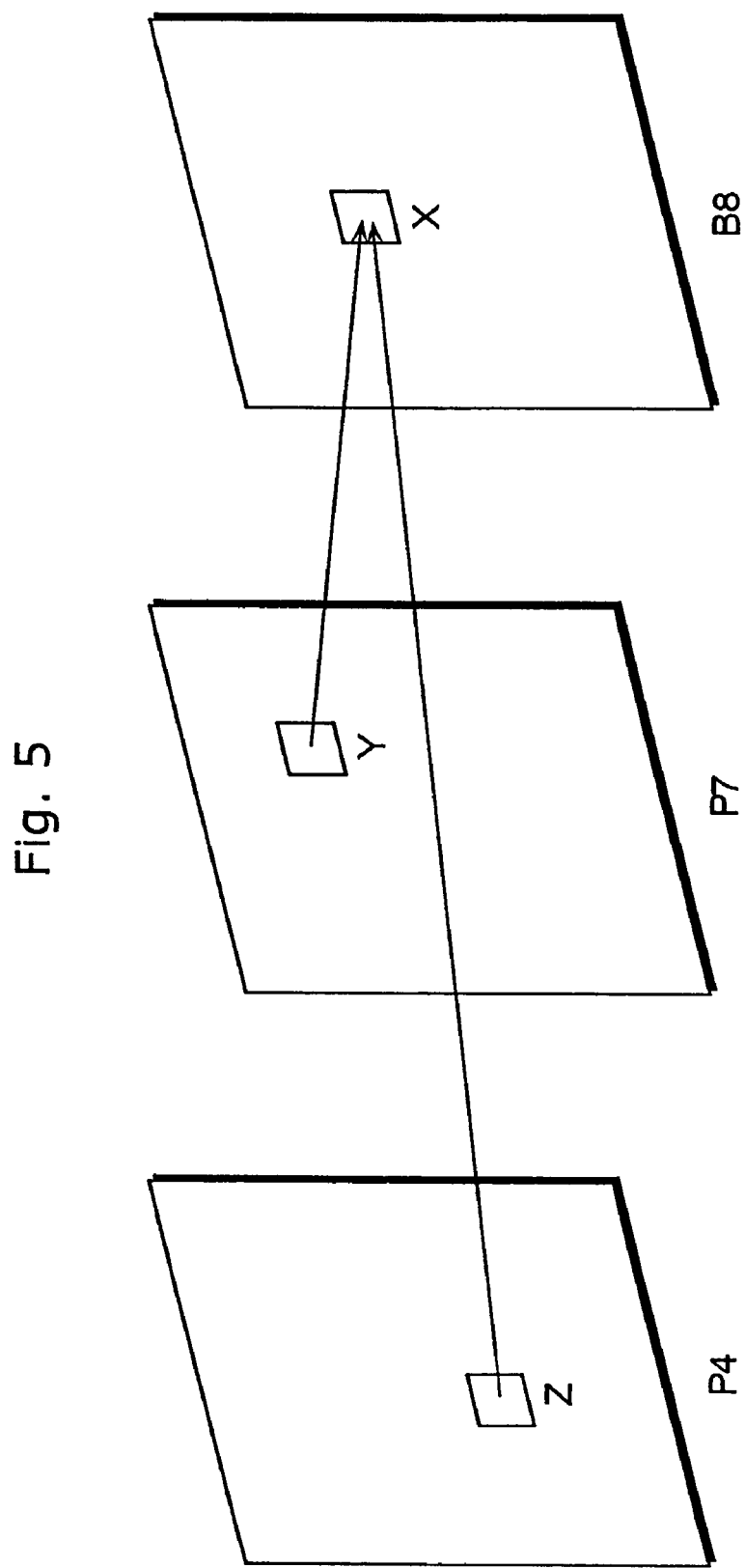

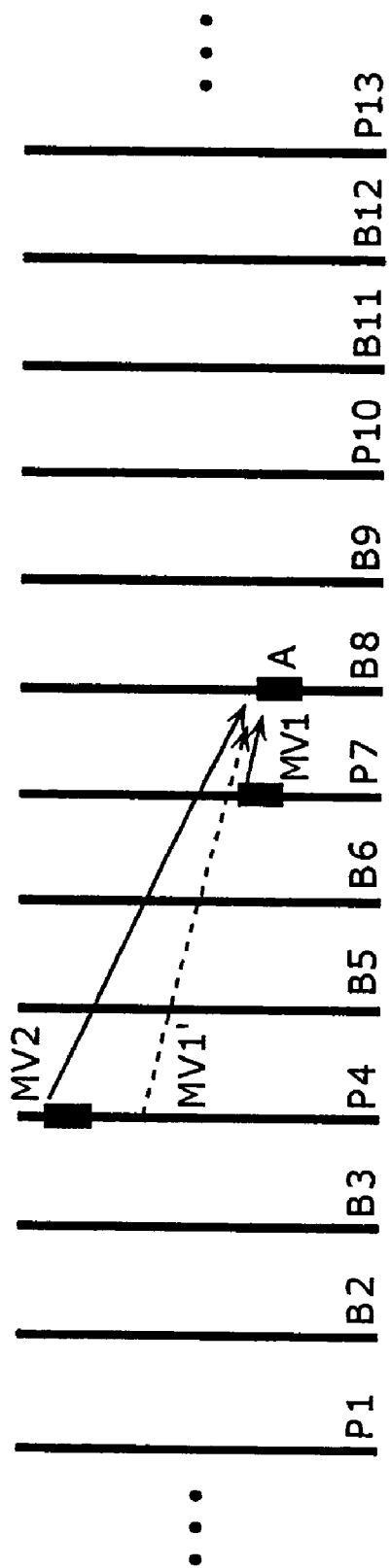

Fig. 10
(a)
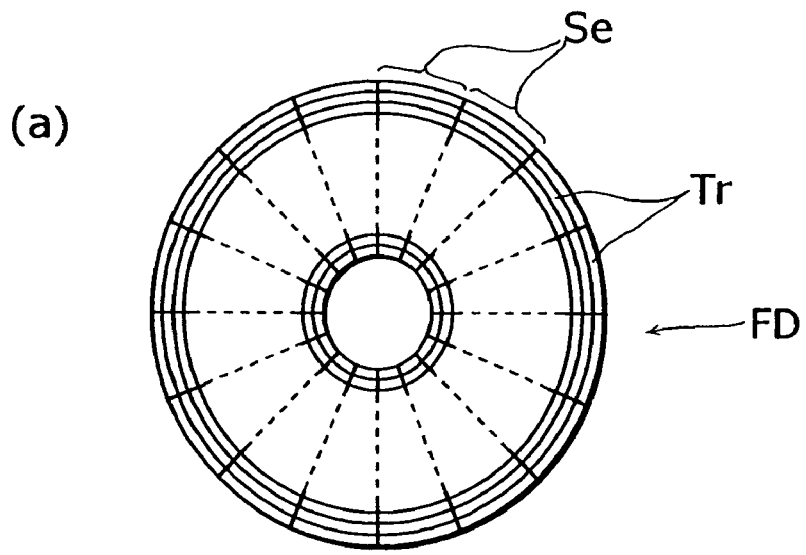
(b)
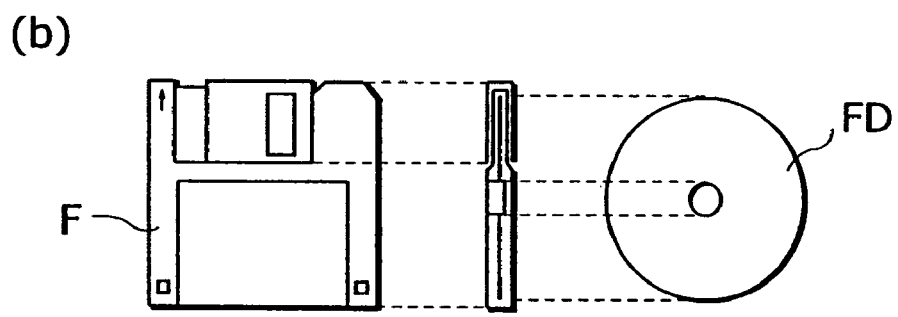
(c)
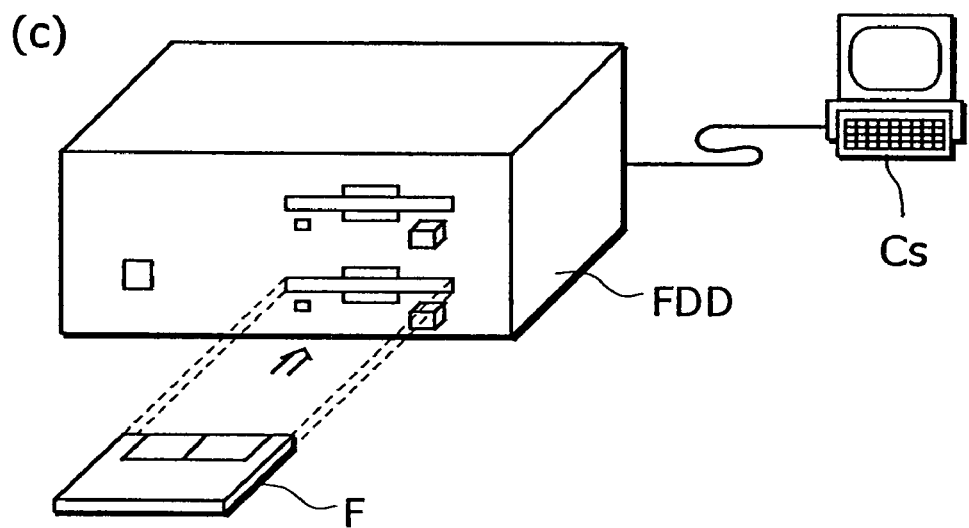

Time

US 8,213,510 B2

MOTION VECTOR CODING AND DECODING METHODS

This application is a continuation application of application Ser. No. 10/473,322, filed Sep. 29, 2003 now U.S. Pat. No. 7,394,853, which is a National Stage Application of International Application No. PCT/JP03/04540, filed Apr. 10, 2003.

FIELD OF THE INVENTION

The present invention relates to methods for coding and decoding motion vector information in coding and decoding moving pictures using inter picture prediction coding.

BACKGROUND OF THE INVENTION

Generally in moving picture coding, information is compressed by suppressing the spatial and temporal redundancies that exist within moving pictures. As a method of suppressing the temporal redundancies, inter picture prediction coding is used. In the inter picture prediction coding, for coding a current picture, pictures temporally preceding or following the current picture are used as reference pictures. The motion of the current picture from the reference pictures is detected, and the difference between the picture obtained by motion compensation and the current picture is calculated. Then, the spatial redundancies are eliminated from this difference, so as to compress the information amount of the moving pictures.

In the conventional moving picture coding method according to the MPEG-4 standard (ISO/IEC 14496-2: 1999 Information technology, Coding of audio-visual objects—Part 2: Visual, pp. 146-148) (hereinafter referred to as MPEG-4) and the like, there are three types of pictures. I-pictures (Intra Coded Pictures) are coded not using inter picture prediction, but intra coded. P-pictures (Predictive Coded Pictures) are coded using inter picture prediction with reference to one preceding picture. B-pictures (Bi-directional Predictive Coded Pictures) are coded using inter picture prediction with reference to one preceding picture (I-picture or P-picture) and one following picture (I-picture or P-picture). FIG. 15 illustrates predictive relations between respective pictures in the above-mentioned moving picture coding method. In FIG. 15, vertical lines show pictures, and picture types (I, P and B) are indicated at the lower right of the respective pictures. The pictures at the heads of the arrows are coded using inter picture prediction with reference to the pictures at the other ends of the arrows. For example, the second B-picture is coded using the first I-picture and the fourth P-picture as reference pictures.

According to the MPEG-4 standard, for coding motion vectors, a difference between a motion vector of a current block and a predicted vector obtained from the motion vectors for the neighboring blocks is coded. Since the motion vectors of the neighboring blocks usually have similar motion size and direction on the spatial coordinate to the motion vectors for the current block, the coding amount of the motion vectors can be reduced by calculating the difference from the predicted vector obtained from the motion vectors of the neighboring blocks. How to code motion vectors according to MPEG-4 will be explained with reference to FIGS. 16A~16D. In these figures, blocks indicated in boldface are macroblocks of 16×16 pixels, and there exist 4 blocks of 8×8 pixels in each macroblock. In FIG. 16A~16D, the motion vector (MV) of each block is coded based on the difference from the predicted vector obtained from the motion vectors (MV1, MV2 and MV3) of the three neighboring blocks. As this predicted vector, medians calculated respectively from the horizontal and vertical components of these three motion vectors MV1, MV2 and MV3 are used. However, a neighboring block has sometimes no motion vector, for example when it is intra coded or it is coded as a B-picture in direct mode. If one of the neighboring blocks is a block of this type, the motion vector for the block is considered equal to 0. If two of the neighboring blocks are blocks of this type, the motion vector of the remaining one block is used as a predicted vector. And when all of the neighboring blocks have no motion vector, the motion vector of the current block is coded on the assumption that the predicted vector is 0.

Meanwhile, H.26L method, which has been developed for standardization, proposes a new coding method of B-pictures. B-pictures are traditionally coded using one previously coded preceding picture and one previously coded following picture as reference pictures, but in the new coding method, B-pictures are coded using two previously coded preceding pictures, two previously coded following pictures, or one previously coded preceding picture and one previously coded following picture.

In the conventional motion vector coding method, even if the neighboring blocks in a B-picture respectively have two motion vectors toward the preceding reference pictures or two motion vectors toward the following reference pictures, there is no definite and unified method of determining which one of these two vectors should be used as a predicted vector, and thus there is no efficient coding method of the determined motion vector.

The present invention is directed to solving the above-mentioned problem. It is an object of the present invention to provide motion vector coding and decoding methods capable of unifying the method of determining a predicted vector for coding a motion vector, and improving predictability.

SUMMARY OF THE INVENTION

In order to achieve above-mentioned object, the motion vector coding method of the present invention is a motion vector coding method for generating a motion vector for a current block to be coded and a predicted vector for the motion vector, and coding a difference between the motion vector and the predicted vector. The motion vector coding method includes an assigning step that, when at least one block among a plurality of coded blocks in the neighborhood of the current block has two motion vectors which refer to reference pictures in the same direction in a display order, assigns IDs to two motion vectors for respective one of the plurality of coded blocks. A generating step for generates the predicted vector for each of the motion vectors for the current block based on the motion vectors with the same ID among the motion vectors for the plurality of coded blocks.

Here, in the assigning step, the IDs may further be assigned to the motion vectors for the current block. In the generating step, the predicted vector for each of the motion vectors for the current block may be generated based on the motion vectors with the same ID as the ID assigned to the motion vector for the current block among the motion vectors for the plurality of coded blocks.

Also, in the assigning step, the IDs may be assigned to the two motion vectors for respective one of the plurality of coded blocks based on an order in a bit stream where each of the motion vectors is placed as the coded difference.

In the assigning step, the IDs may be assigned to the two motion vectors for a respective plurality of coded blocks. The IDS may be assigned in descending and ascending order of temporal distances in the display order from a picture including the current block to the reference pictures referred to by the two motion vectors.

In the generating step, motion vectors, which refer to the same reference picture as the motion vector for the current block, are selected from among the motion vectors with the same ID; and the predicted vector may be generated based on the selected motion vectors.

In the generating step, a median of the selected motion vectors may be generated as the predicted vector.

The moving picture coding method, motion vector decoding method, moving picture decoding method, motion vector coding apparatus, motion vector decoding apparatus and programs for them according to the present invention are structured similarly to the above-mentioned motion vector coding method.

In the motion vector coding method of the present invention, a motion vector of each current block is coded using a difference between a predicted vector obtained from motion vectors of previously coded neighboring blocks and the motion vector of the current block. This predicted vector can be generated by one of the following processes. When the current block and the neighboring blocks respectively have a plurality of motion vectors pointing the reference pictures in the same direction (forward or backward): (A) the motion vectors which refer to the same picture are selected from among the motion vectors for the neighboring blocks so as to generate the predicted vector (based on the selected motion vectors); (B) the motion vectors for the respective neighboring blocks are ordered in the predetermined order, and the motion vectors of the same order rank are selected from the ordered motion vectors so as to generate the predicted vector (based on the selected motion vectors); and (C) the predicted vector for "the second motion vector" of the current block shall be "the first motion vector", and if "the second motion vector" and "the first motion vector" refer to different pictures, "the first motion vector" is scaled according to the temporal distance between the pictures so as to generate the predicted vector.

Accordingly, even when a block has a plurality of motion vectors pointing in the same direction (forward or backward), the method for coding the motion vectors can be unified, and the coding efficiency of the motion vectors can be improved.

On the other hand, in the motion vector decoding method of the present invention, a motion vector of each current block is decoded by adding a predicted vector obtained from the motion vectors of the decoded neighboring blocks and the motion vector of the current block. This predicted vector is generated by one of the following processes when the current block and the neighboring blocks respectively have a plurality of motion vectors pointing the reference pictures in the same direction (forward or backward); (A) the motion vectors which refer to the same picture are selected from among the motion vectors for the neighboring blocks so as to generate the predicted vector (based on the selected motion vectors); (B) the motion vectors for the respective neighboring blocks are ordered in the predetermined order, and the motion vectors of the same order rank are selected from the ordered motion vectors so as to generate the predicted vector (based on the selected motion vectors); and (C) the predicted vector for "the second motion vector" of the current block shall be "the first motion vector", and if "the second motion vector" and "the first motion vector" refer to different pictures, "the first motion vector" is scaled according to the temporal distance between the pictures so as to generate the predicted vector.

Accordingly, the motion vector which is coded by the motion vector coding method of the present invention can be correctly decoded.

BRIEF DESCRIPTION OF DRAWINGS

FIG. 2A is a diagram illustrating the order of pictures inputted to a frame memory.

FIG. 2B is a diagram illustrating the order of coding the pictures.

FIG. 4A is a diagram illustrating reference pictures which motion vectors of a current block to be coded and previously coded neighboring blocks refer to respectively.

FIG. 4B is a diagram illustrating reference pictures which motion vectors of a current block to be coded and previously coded neighboring blocks refer to respectively.

FIG. 4C is a diagram illustrating reference pictures which motion vectors of a current block to be coded and previously coded neighboring blocks refer to respectively.

FIG. 5 is a diagram illustrating motion compensation in the case where two reference pictures are both located in a forward direction.

FIG. 6 is a diagram illustrating the case where motion vectors are scaled.

FIG. 10A is a diagram illustrating a physical format of a flexible disk.

FIG. 10B is a diagram illustrating a flexible disk, the cross-sectional view of the appearance of the flexible disk, and the front view of the appearance of the flexible disk.

FIG. 10C is a diagram illustrating the appearance of an apparatus for writing and reading out a program on and from the flexible disk.

DETAILED DESCRIPTION OF THE INVENTION

Figure 1:
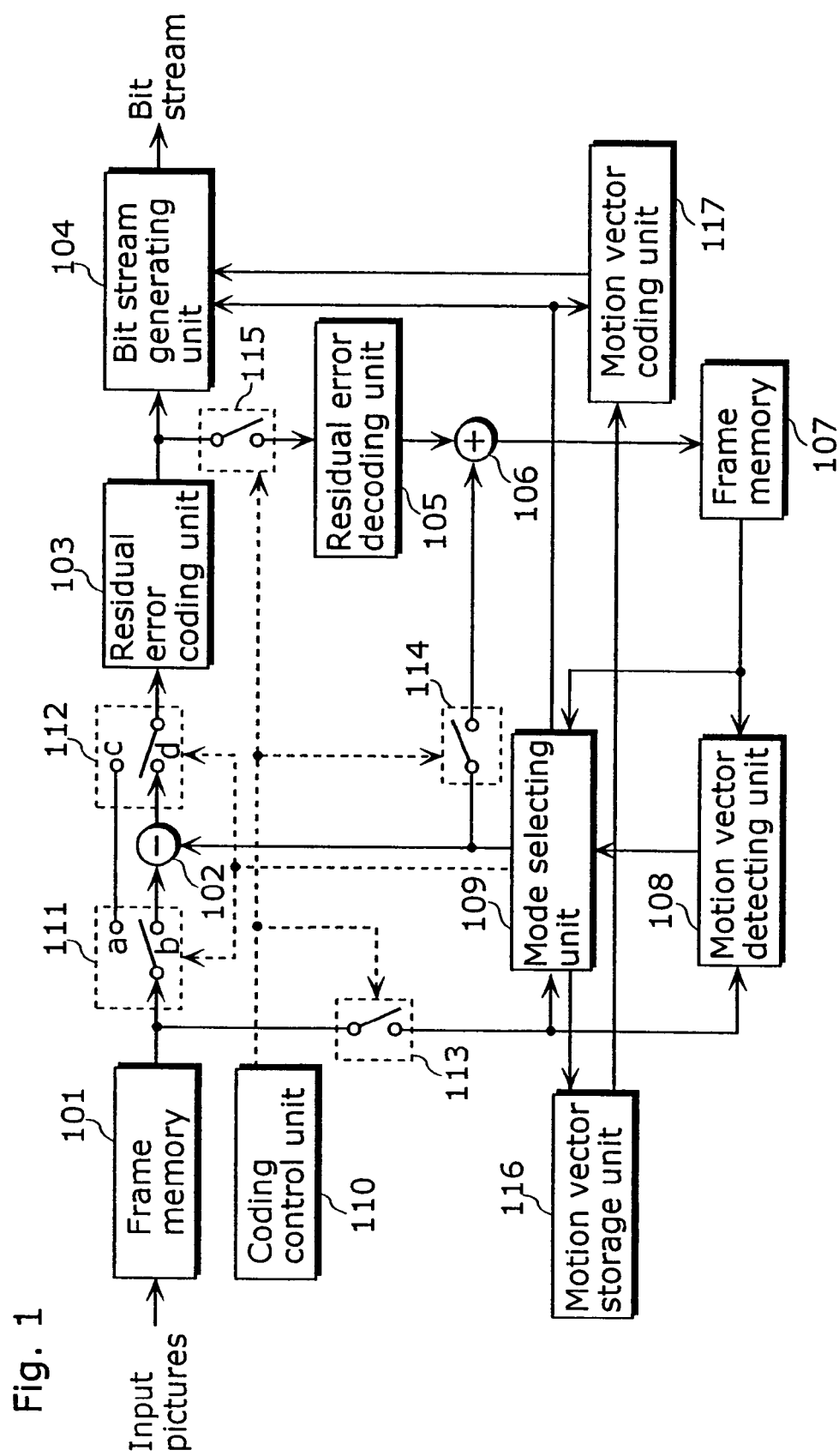
FIG. 1 is a block diagram illustrating the structure of a picture coding apparatus according to a first embodiment of the present invention.
Figure 3A:
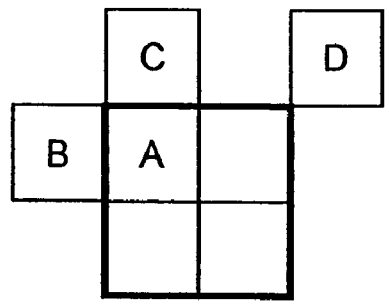
FIG. 3A is a diagram illustrating a current block to be coded (at the upper left in a macroblock) and the previously coded neighboring blocks.
Figure 3B:
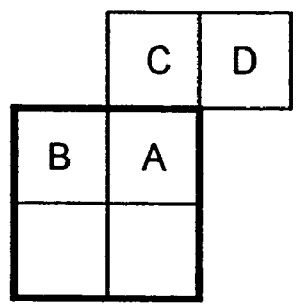
FIG. 3B is a diagram illustrating a current block to be coded (at the upper right in a macroblock) and the previously coded neighboring blocks.
Figure 3C:
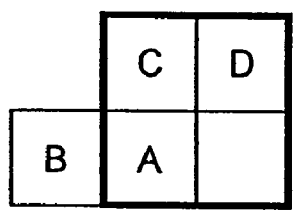
FIG. 3C is a diagram illustrating a current block to be coded (at the lower left in a macroblock) and the previously coded neighboring blocks.
Figure 3D:
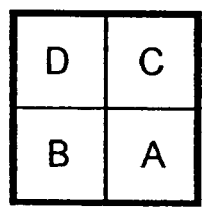
FIG. 3D is a diagram illustrating a current block to be coded (at the lower right in a macroblock) and the previously coded neighboring blocks.

The first embodiment of the present invention will be explained below with reference to the FIGS. 1-8. FIG. 1 is a block diagram of the picture coding apparatus for coding motion vectors as a part of picture coding, including a frame memory 101, a difference calculating unit 102, a residual error coding unit 103, a bit stream generating unit 104, a residual error decoding unit 105, an addition unit 106, a frame memory 107, a motion vector detecting unit 108, a mode selecting unit 109, a coding control unit 110, switches 111~115, a motion vector storage unit 116 and a motion vector coding unit 117.

Pictures are inputted to the frame memory 101 on picture-by-picture basis in display order. FIG. 2A illustrates the order of inputting pictures into the frame memory 101. In FIG. 2A, vertical lines show pictures, and an alphabet and a number at the lower right of each picture respectively indicate a picture type (P indicates a P-picture and B indicates a B-picture) and a picture number in display order. The pictures inputted to the frame memory 101 are reordered into coding order. The pictures are reordered in coding order based on the reference relations in inter picture prediction coding. That is, the pictures are reordered so that the pictures used as reference pictures are coded earlier than the pictures which refer to those reference pictures. For example, the reference relations of the pictures B8 and B9 are illustrated by arrows in FIG. 2A. In this figure, the arrowheads indicate the pictures which refer to reference pictures, and the other ends of the arrows indicate the reference pictures. In this case, the pictures shown in FIG. 2A are reordered into those as illustrated in FIG. 2B.

The pictures reordered in the frame memory 101 are read out by every macroblock. In this case, a macroblock shall be horizontal 16×vertical 16 pixels in size, and motion compensation shall be performed by every block (8×8 pixels in size). Coding of the picture B8 will be explained step by step.

The picture B8 is a B-picture and coded by every macroblock or block using a maximum of two reference pictures among five coded pictures, preceding coded pictures P1, P4 and P7 and following coded pictures P10 and P13. These reference pictures have already been coded, and the local decoded pictures are stored in the frame memory 107.

For coding a B-picture, the coding control unit 110 turns the switch 113 ON. If a B-picture is used as a reference picture for other pictures, the coding control unit 110 controls the switches 114 and 115 to be ON. If the B-picture is not used as a reference picture for other pictures, it controls the switches 114 and 115 to be OFF. Therefore, the macroblocks of the picture B8 read out from the frame memory 101 are first inputted to the motion vector detecting unit 108, the mode selecting unit 109 and the difference calculating unit 102.

The motion vector detecting unit 108 detects forward motion vectors and backward motion vectors of each block included in a macroblock using the decoded picture data of the pictures P1, P4 and P7 as forward reference pictures and the decoded picture data of the pictures P10 and P13 as backward reference pictures, which are respectively stored in the frame memory 107.

The mode selecting unit 109 determines the coding mode of macroblocks using the motion vectors detected by the motion vector detecting unit 108. Here, the coding mode of macroblocks in a B-picture can be selected from among intra picture coding, inter picture prediction coding using one forward reference picture, inter picture prediction coding using two forward reference pictures, inter picture prediction coding using one backward reference picture, inter picture prediction coding using two backward reference pictures, and inter picture prediction coding using bi-directional motion vectors, for example. When inter picture prediction coding using two forward reference pictures, inter picture prediction coding using two backward reference pictures or inter picture prediction coding using bi-directional motion vectors (one forward reference and one backward reference) is selected, the block obtained by averaging two reference blocks is used as a motion compensation block. One example of this case will be explained with reference to FIG. 5. In this figure, for motion compensation of a block X in the picture B8 using a block Y in the picture P7 and a block Z in the picture P4 as forward reference pictures, the average block of the blocks Y and Z is used as a motion compensation block for the block X.

The coding mode determined by the mode selecting unit 109 is outputted to the bit stream generating unit 104. The reference blocks based on the coding mode determined by the mode selecting unit 109 are outputted to the difference calculating unit 102 and the addition unit 106. If the intra picture coding is selected, the reference blocks are not outputted. If the mode selecting unit 109 selects intra picture coding, the switch 111 and the switch 112 are controlled to be connected respectively to "a" and "c", and if it selects inter picture prediction coding, the switch 111 and the switch 112 are controlled to be connected respectively to "b" and "d". The case where the mode selecting unit 109 selects inter picture prediction coding will be explained below.

The difference calculating unit 102 receives the reference blocks from the mode selecting unit 109. The difference calculating unit 102 calculates the difference between the block of the picture B8 and the reference block (the motion compensation block), and generates the residual error for output.

The residual error is inputted to the residual error coding unit 103. The residual error coding unit 103 performs coding processing such as frequency conversion and quantization of the inputted residual error and thus generates the coded data of residual error for output. The coded data outputted from the residual error coding unit 103 is inputted to the bit stream generating unit 104.

The motion vectors used in the coding mode selected by the mode selecting unit 109 are outputted to the motion vector storage unit 116 and the motion vector coding unit 117.

The motion vector storage unit 116 stores the motion vectors inputted from the mode selecting unit 109. In other words, the motion vector storage unit 116 stores the motion vectors which have been used for the previously coded blocks.

The motion vector coding unit 117 codes the motion vectors inputted from the mode selecting unit 109. This operation will be explained with reference to FIGS. 3A~3D. In these figures, blocks shown in boldface are macroblocks of 16×16 pixels, and there exist four blocks of 8×8 pixels in each macroblock. In FIGS. 3A~3D, a block A is a current block which is to be coded, and the motion vector for the block A is coded based on the difference from the predicted vector obtained from the motion vectors of the three neighboring coded blocks B, C and D. The motion vectors for the neighboring blocks are obtained from the motion vector storage unit 116.

Methods of calculating a predicted vector will be explained with reference to FIGS. 4A~4C. These figures illustrate the motion vectors for the blocks A~D. MV1 and MV2 indicate the first motion vector and the second motion vector respectively. "Forward" means a forward reference motion vector. Signs and numbers in parentheses show the reference pictures.

By the first method, the predicted vector is generated by selecting only the motion vectors which refer to the same reference picture as the motion vector of the current block, from the motion vectors for the neighboring blocks. In FIG. 4A, the predicted vector for MV1 for the block A is the median of MV1 respective for the blocks B, C and D, and the predicted vector for MV2 for the block A is the median of MV2 respective for the blocks B, C and D. In FIG. 4B, the predicted vector for MV1 for the block A is the median of MV1 respective for the blocks B, C and D, and the predicted vector for MV2 for the block A is the MV2 for the block C itself. In FIG. 4C, the predicted vector for MV1 for the block A is the median of MV1 and MV2 for the block B, MV1 for the block C and MV1 and MV2 for the block D, and the predicted vector for MV2 for the block A is the MV2 for the block C itself. In this case, the predicted vector for MV1 for the block A may be the median of three vectors: 1) the average of MV1 and MV2 for the block B; 2) MV1 for the block C; or 3) the average of MV1 and MV2 for the block D. The average of MV1 and MV2 for the block B is rounded to the precision of the motion vectors (e.g., 2/1 pixel precision, 1/4 pixel precision and 1/8 pixel precision). This pixel precision is determined by every block, picture or sequence. In such a case, if there is no motion vector for the neighboring blocks which refer to the same reference picture, the predicted vector may be 0. The medians are calculated for horizontal and vertical components of the motion vector respectively.

By the second method, the predicted vectors are created separately for MV1 and MV2, regardless of the reference pictures. In this case, the order of MV1 and MV2 in each block may be determined by a specified method. For example, MV1 and MV2 may be ordered in descending or ascending order of temporal distances from the current picture to the reference pictures, forward vectors first or backward vectors first, in coding order (in the order in a bit stream), or the like. For example, the descending or ascending order of temporal distances from the current picture to the reference pictures increases the probability that the reference picture for the motion vector of the current block is temporally close to the reference picture for the motion vector selected for a predicted vector. Thus, motion vector coding efficiency can be improved. Also, the order of forward vectors first and backward vectors second increases the probability that the forward motion vector of the current block is coded using the predicted vector generated from the forward motion vectors of the neighboring blocks. Additionally, the backward motion vector of the current block is coded using the predicted vector generated from the backward motion vectors of the neighboring blocks, and thus motion vector coding efficiency can be improved. Further, the coding order can simplify the method for managing the neighboring blocks for generating a predicted vector. In FIG. 4A, the predicted vector for MV1 for the block A is the median of MV1 respective for the blocks B, C and D, and the predicted vector for MV2 for the block A is the median of MV2 respective for the blocks B, C and D. Also, in FIGS. 4B and 4C, the predicted vector for MV1 for the block A is the median of MV1 respective for the blocks B, C and D, and the predicted vector for MV2 for the block A is the median of MV2 respective for the blocks B, C and D. If the reference pictures of the motion vectors for the block A are different from the reference pictures of the motion vectors for the blocks B, C and D which are used for the predicted vector for the block A, the motion vectors for the blocks B, C and D may be scaled. They may be scaled based on a value determined by temporal distance between pictures or a predetermined value.

By the third method, the predicted vector for MV1 is generated based on the neighboring blocks for use. If MV1 is used as a predicted vector for MV2, the MV1 itself may be used as the predicted vector, or the scaled MV1 may be used. If the scaled one is used, it is conceivable to make the temporal distance between the picture B8 and the reference picture of MV1 equal to the temporal distance between the picture B8 and the reference picture of MV2. An example of how to make them equal will be explained with reference to FIG. 6. In FIG. 6, it is assumed that the block A in the picture B8 has the motion vectors MV1 and MV2 and the reference pictures of MV1 and MV2 are the pictures P7 and P4 respectively. In this case, MV1' obtained by scaling MV1 to the picture P4 (that is a vector obtained by quadrupling horizontal and vertical components of MV1 respectively in this example) is used as a predicted vector for the motion vector MV2. Or, it may be scaled using a predetermined value for another method. In addition, the order of MV1 and MV2 for each block may be predetermined by a specified method. For example, MV1 and MV2 may be ordered in descending or ascending order of temporal distances from the current picture to the reference pictures, forward vectors first or backward vectors first, in coding order, or the like.

In the above examples, all of the blocks B~D have motion vectors, but if these blocks are coded as intra blocks or in direct mode, exceptional processing may be performed for them. For example, if one of the blocks B~D is a block of such a type, the motion vectors for that block are considered to be 0 for coding. If two of them are blocks of such a type, the motion vectors of the remaining block are used as predicted vectors. And if all of the blocks have no motion vector, motion vectors are coded on the assumption that the predicted vector is 0. This type of processing may also be applied.

Upon receipt of the coded data, the bit stream generating unit 104 performs variable length coding of the coded data, and further adds the information, (e.g. as the coded motion vectors inputted from the motion vector coding unit 117, the coding mode inputted from the mode selecting unit 109, and the header information, to the coded data, so as to generate a bit stream for output).

According to the same processing, the remaining macroblocks in the picture B8 are coded.

As described above, according to the motion vector coding method of the present invention, a motion vector for each current block is coded using a difference between the predicted vector which is obtained from motion vectors for previously coded neighboring blocks and the motion vector for the current block. This predicted vector is generated by one of the following processes. When the current block and the neighboring blocks respectively have a plurality of motion vectors pointing the reference pictures in the same direction (forward or backward): (A) the motion vectors which refer to the same picture are selected from among the motion vectors for the neighboring blocks so as to generate the predicted vector (based on the selected motion vectors); (B) the motion vectors for the respective neighboring blocks are ordered in the predetermined order, and the motion vectors of the same order rank are selected from the ordered motion vectors so as to generate the predicted vector (based on the selected motion vectors); and (C) the predicted vector for "the second motion vector" of the current block shall be "the first motion vector", and if "the second motion vector" and "the first motion vector" refer to different pictures, "the first motion vector" is scaled according to the temporal distance between the pictures so as to generate the predicted vector.

More specifically, the motion vector coding method according to the present invention is a motion vector coding method for generating a motion vector for a current block to be coded and a predicted vector for the motion vector, and then coding a difference between the motion vector and the predicted vector. The motion vector coding method includes: an assigning step that, when at least one block among a plurality of coded blocks in the neighborhood of the current block has two motion vectors which refer to reference pictures in the same direction in a display order, assigns IDs to two motion vectors for respective one of the plurality of coded blocks; and a generating step that generates the predicted vector for each of the motion vectors for the current block based on the motion vectors with the same ID among the motion vectors for the plurality of coded blocks. Here, in the above-mentioned assigning step and the generating step, the following (a) and (b) can be executed:

(a) in the assigning step, the IDs are further assigned to the motion vectors for the current block, and in the generating step, the predicted vector for each of the motion vectors for the current block is generated based on the motion vectors with the same ID as the ID assigned to the motion vector for the current block among the motion vectors for the plurality of coded blocks; and (b) in the assigning step, the IDs are further assigned to the motion vectors for the current block. The generating step includes a generating sub-step for generating a candidate predicted vector by each ID based on the motion vectors with the same ID among the motion vectors for the plurality of coded blocks; and an associating sub-step for associating the candidate predicted vector with said each ID for the motion vector for the current block.

Accordingly, even when a neighboring block has a plurality of motion vectors pointing in the same direction (forward or backward), the method for coding the motion vectors can be unified, and the coding efficiency of the motion vectors can be improved.

In the present embodiment, a macroblock is horizontal 16×vertical 16 pixels, motion compensation is performed by every block of 8×8 pixels, and the residual error is coded by every horizontal 8×vertical 8 pixels, but any other number of pixels may also be applied.

Further, in the present embodiment, a motion vector of a current block is coded using the median of the motion vectors of the three previously coded neighboring blocks as a predicted vector, but the number of the neighboring blocks may be any other numbers, and the predicted vector may be determined by any other methods. For example, the motion vectors for the block immediately left of the current block may be used for a predicted vector.

In the present embodiment, the location of the previously coded neighboring block for motion vector coding has been explained with reference to FIG. 3, but any other locations may be applied.

For example, if the blocks of 8×8 pixels of the present embodiment and blocks of any other sizes are mixed, the following coded neighboring blocks B, C and D may be used for the current block A. Specifically, it may be determined that the block B is a block containing a pixel to the left of the upper left pixel in the block A, the block C is a block containing a pixel just above the upper left pixel in the block A, and the block D is a block containing a pixel above and to the right of the upper right pixel in the block A.

In an embodiment of the present embodiment, a motion vector is coded by calculating the difference between the motion vector of a current block and the predicted vector obtained from the motion vectors for the neighboring blocks. However, it may be coded by other methods than the difference calculation.

In addition, in the present embodiment, the first, second and third methods of generating the predicted vector for motion vector coding have been respectively explained, but these methods may be used in combination.

Figure 7:
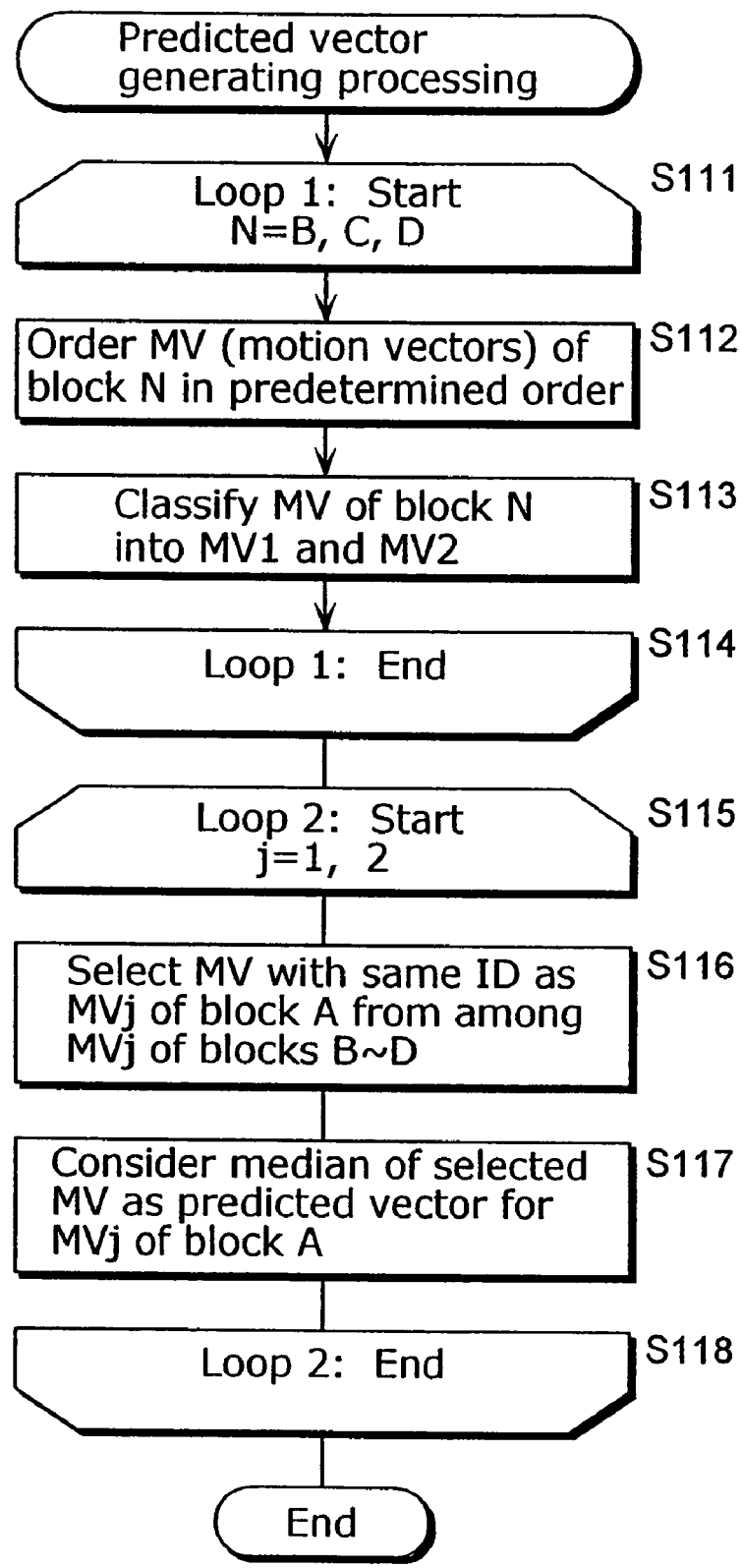
FIG. 7 is a flowchart illustrating a predicted vector generating method in the case where the first and second predicted vector generating methods are used in combination.

An example of the combined method will be explained with reference to FIG. 7. FIG. 7 is a flowchart illustrating the case where the first and second predicted vector generating methods are combined, and more specifically, the processing of generating a predicted vector in the case where a block A in FIGS. 3A~3D is a current block and two motion vectors of each neighboring block B~D point the reference blocks in the same direction (forward or backward). In this figure, Steps S115~S118 correspond to the above-mentioned first predicted vector generating method. And Steps S111~S114 correspond to a part of determining the order of the neighboring blocks for the second method.

Figure 8:
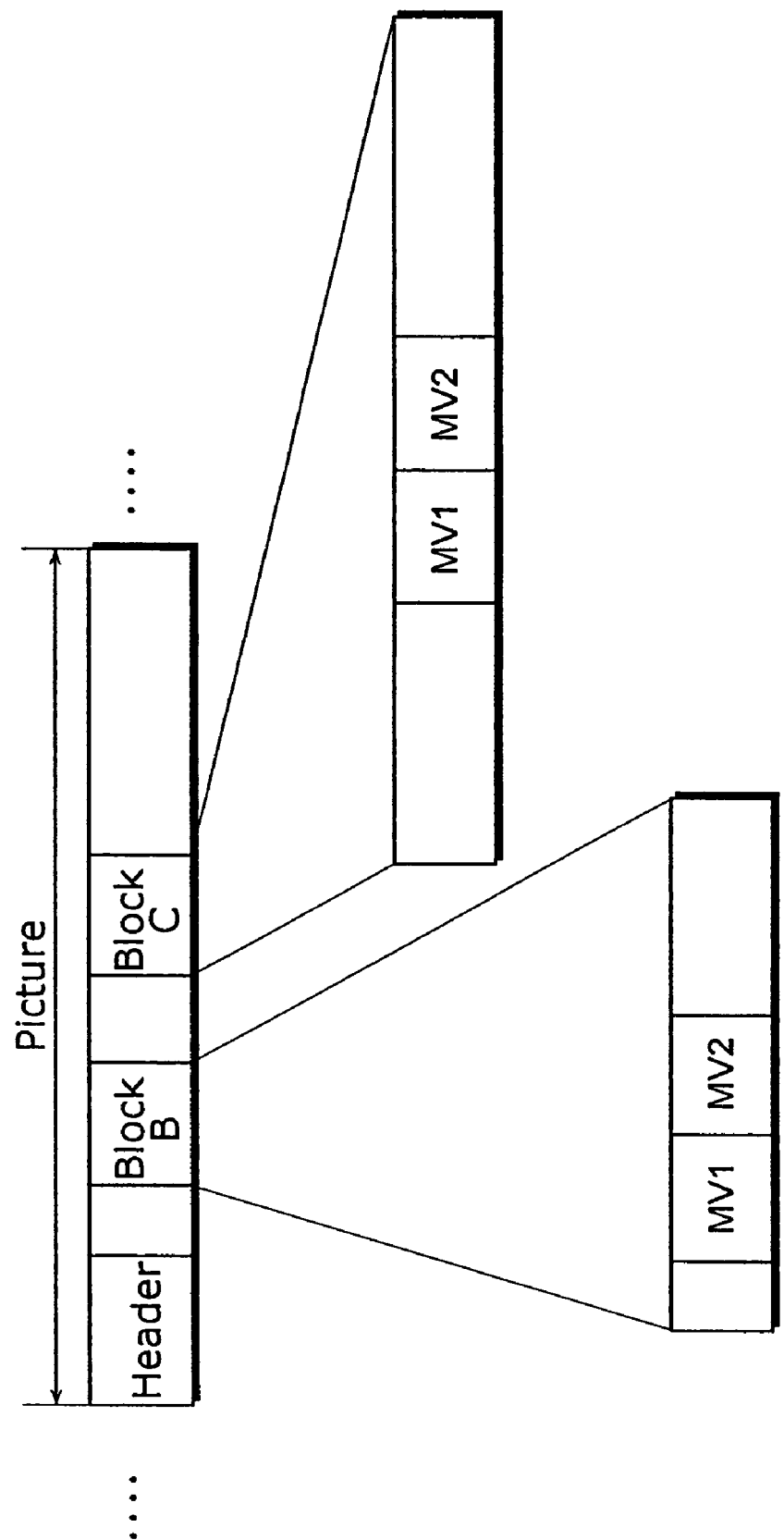
FIG. 8 is a diagram illustrating the order of motion vectors placed in a bit stream.

A predetermined order in S112 may be the descending or ascending order of temporal distances from the current picture to the reference pictures, coding order, or the like. Here, the coding order is the order in a bit stream, as illustrated in FIG. 8. FIG. 8 illustrates picture data corresponding to one picture in a bit stream. The picture data includes a header and coded data of respective blocks. The motion vectors are placed in the coded data of the blocks. In this figure, the motion vectors for the blocks B and C are placed in coding order.

In S113, the motion vectors in the predetermined order are classified into MV1 and MV2 according to their order ranks. This classification of the motion vectors for the neighboring blocks allows more simplified processing. If the motion vectors are not classified, the median of a maximum of 6 motion vectors (2 motion vectors×3 neighboring blocks) needs to be calculated.

More specifically, in the processing of Loop 1, two motion vectors for the neighboring block B are first ordered in the above predetermined order (S112), and IDs (for instance, 0 and 1, 1 and 2, MV1 and MV2, or the like) are assigned to them in this order (S113). The IDs (for instance, 0 and 1, 1 and 2, MV1 and MV2, or the like) are also assigned to the motion vectors respectively for the neighboring blocks C and D in the same manner. At this time, the IDs are also assigned to the two motion vectors for the current block A in the same manner.

Next, in the processing of Loop 2, the motion vectors with the same ID (for instance, 0 or 1) are first selected from among the motion vectors for the neighboring blocks B~D (S116), and the median of the selected motion vectors are considered as a predicted vector for the current block A (S117). The predicted vector for another motion vector is also obtained in the same manner.

Note that in Loop 2, the above-mentioned two medians may be calculated as candidate predicted vectors, regardless of the IDs of the motion vectors for the block A, so as to select any one of the candidate vectors for (or associate it with) each ID of the motion vector for the block A. Also, in Loop 1, the IDs does not need to be assigned when generating the predicted vectors for the block A, but may be assigned when detecting the motion vectors for the neighboring blocks B, C and D. The assigned IDs as well as the motion vectors are stored in the motion vector storage unit 116.

For using the second and third predicted vector generating methods together, the third predicted vector generating method can be executed instead of S115~S118 in FIG. 7.

In the present embodiment, a predicted vector is generated for coding a motion vector on the assumption that a current block has forward reference motion vectors only, but the predicted vector can be generated in the same manner even if the current block has a backward reference motion vector.

Further, in the present embodiment, a predicted vector is generated for coding a motion vector on the assumption that all neighboring blocks have two motion vectors respectively. However, even if a neighboring block has only one motion vector, the motion vector can be dealt with as a first or a second motion vector.

In addition, in the present embodiment, the case where the maximum number of reference pictures is 2 has been explained, but it may be 3 or more.

In addition, there are the following methods for storing and managing motion vectors in the motion vector storage unit 116 of the present embodiment: (1) motion vectors for neighboring blocks and the order thereof (IDs indicating whether they are the first motion vectors or the second motion vectors) are stored so as to acquire the first or the second motion vector for each neighboring block from the motion vector storage unit 116 using the IDs; and (2) the locations for storing the first motion vector and the second motion vector for each neighboring block are predetermined so as to acquire the first or the second motion vector for the neighboring block from the motion vector storage unit 116 by accessing the storage locations thereof.

Figure 9:
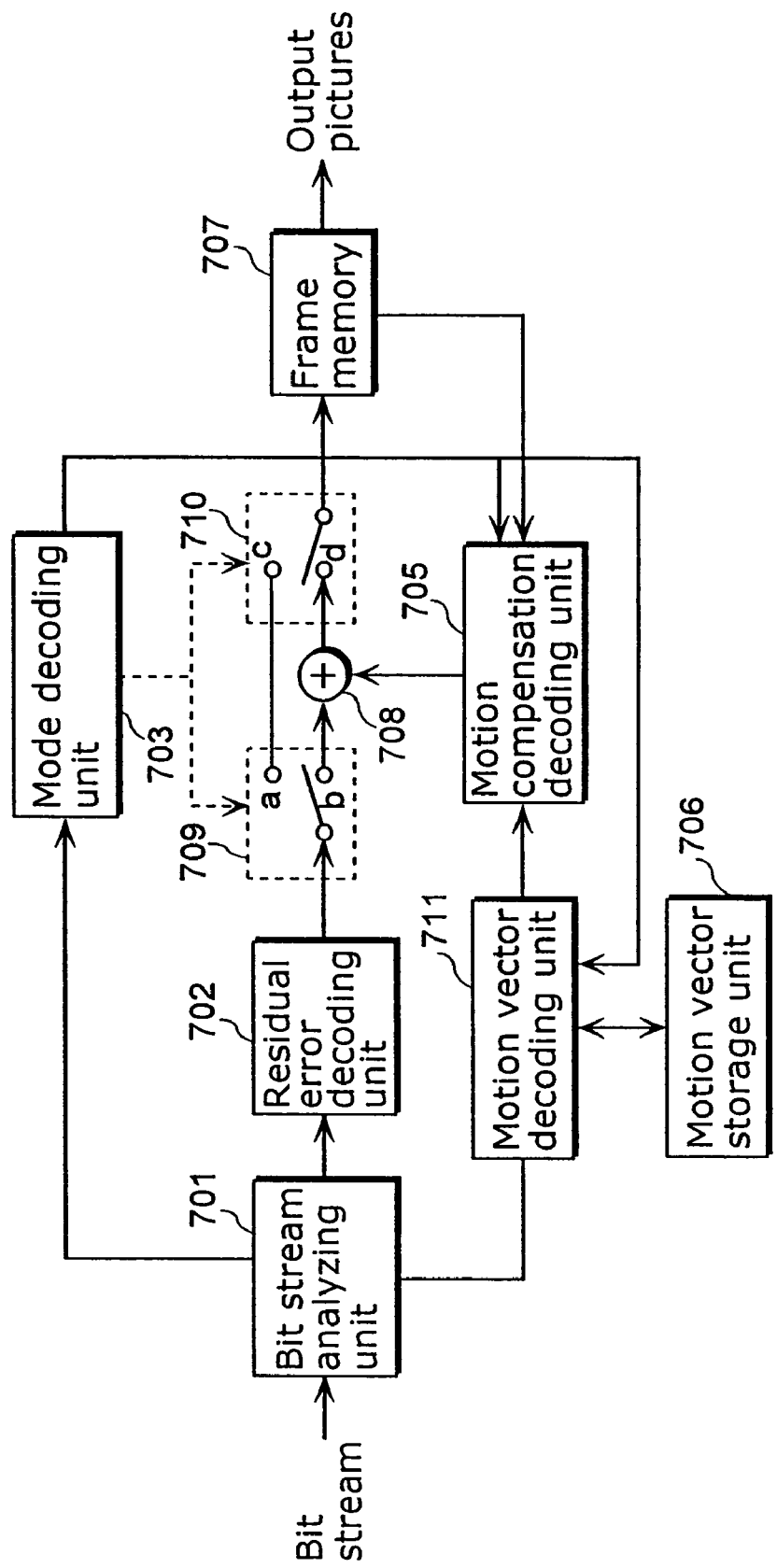
FIG. 9 is a block diagram illustrating the structure of a picture decoding apparatus according to a second embodiment of the present invention.

The second embodiment of the present invention will be explained below with reference to FIG. 9. FIG. 9 is a block diagram of the picture decoding apparatus for decoding motion vectors as a part of picture decoding, including a bit stream analyzing unit 701, a residual error decoding unit 702, a mode decoding unit 703, a motion compensation decoding unit 705, a motion vector storage unit 706, a frame memory 707, an addition unit 708, switches 709 and 710, and a motion vector decoding unit 711.

The input order of pictures in the bit stream is the same as that illustrated in FIG. 2B. Decoding processing of the picture B8 will be explained below.

The bit stream of the picture B8 is inputted to the bit stream analyzing unit 701. The bit stream analyzing unit 701 extracts various types of data from the inputted bit stream. Here, various types of data include mode selection information and motion vector information. The extracted mode selection information is outputted to the mode decoding unit 703. The extracted motion vector information is outputted to the motion vector decoding unit 711. The coded data of residual error is outputted to the residual error decoding unit 702.

The mode decoding unit 703 controls the switch 709 and the switch 710 based on the mode selection information extracted from the bit stream. If the mode selection is intra picture coding, it controls the switch 709 and the switch 710 to be connected to "a" and "c" respectively. If the mode selection is inter picture prediction coding, it controls the switch 709 and the switch 710 to be connected to "b" and "d" respectively.

The mode decoding unit 703 also outputs the mode selection information to the motion compensation decoding unit 705 and the motion vector decoding unit 711. The case where the mode selection is inter picture prediction coding will be explained below.

The residual error decoding unit 702 decodes the inputted coded data of residual error to generate residual errors. The generated residual errors are outputted to the switch 709. Since the switch 709 is connected to "b" here, the residual errors are outputted to the addition unit 708.

The motion vector decoding unit 711 performs decoding processing of the coded motion vectors which are inputted from the bit stream analyzing unit 701. The coded motion vectors are decoded using the motion vectors of the previously decoded neighboring blocks. This operation will be explained with reference to FIGS. 3A~3D. The coded motion vector (MV) for the current block A which is to be decoded is calculated by adding the predicted vector obtained from the motion vectors of the three previously decoded neighboring blocks B, C and D and the coded motion vector. The motion vectors of the neighboring blocks are obtained from the motion vector storage unit 706.

Methods of calculating a predicted vector will be explained with reference to FIGS. 4A~4C. These figures show the motion vectors for the blocks A~D. MV1 and MV2 indicate the first motion vectors and the second motion vectors respectively. "Forward" means a forward reference motion vector. Signs and numbers in parentheses show the reference pictures.

By the first method, the predicted vector is generated by selecting only the motion vectors which refer to the same reference picture as the motion vector for the current block, from the motion vectors for the neighboring blocks. In FIG. 4A, the predicted vector for MV1 for the block A is the median of MV1 respective for the blocks B, C and D, and the predicted vector for MV2 for the block A is the median of MV2 respective for the blocks B, C and D. In FIG. 4B, the predicted vector for MV1 for the block A is the median of MV1 respective for the blocks B, C and D, and the predicted vector for MV2 for the block A is the MV2 for the block C itself. In FIG. 4C, the predicted vector for MV1 for the block A is the median of MV1 and MV2 for the block B, MV1 for the block C and MV1 and MV2 for the block D, and the predicted vector for MV2 for the block A is the MV2 for the block C itself. In this case, the predicted vector for MV1 for the block A may be the median of three vectors: 1) the average of MV1 and MV2 for the block B; 2) MV1 for the block C; or 3) the average of MV1 and MV2 for the block D. The average of MV1 and MV2 for the block B is rounded to the precision of the motion vectors (such as 2/1 pixel precision, 1/4 pixel precision and 1/8 pixel precision). This pixel precision is determined by every block, picture or sequence. In such a case, if there is no motion vector for the neighboring blocks which refer to the same reference picture, the predicted vector may be 0. The medians are calculated for horizontal and vertical components of the motion vector respectively.

By the second method, the predicted vectors are created separately for MV1 and MV2, regardless of the reference pictures. In this case, the order of MV1 and MV2 in each block may be determined by a specified method. For example, MV1 and MV2 may be ordered in descending or ascending order of temporal distances from the current picture to the reference pictures, forward vectors first or backward vectors first, in decoding order (in the order in a bit stream), or the like. In FIG. 4A, the predicted vector for MV1 for the block A is the median of MV1 respective for the blocks B, C and D, and the predicted vector for MV2 for the block A is the median of MV2 respective for the blocks B, C and D. Also, in FIGS. 4B and 4C, the predicted vector for MV1 for the block A is the median of MV1 respective for the blocks B, C and D, and the predicted vector for MV2 for the block A is the median of MV2 respective for the blocks B, C and D. If the reference pictures of the motion vectors for the block A are different from the reference pictures of the motion vectors for the blocks B, C and D which are used for the predicted vector for the block A, the motion vectors for the blocks B, C and D may be scaled. They may be scaled based on a value determined by temporal distance between pictures or a predetermined value.

By the third method, the predicted vector for MV1 is generated based on the neighboring blocks for use. If MV1 is used as a predicted vector for MV2, the MV1 itself may be used as the predicted vector, or the scaled MV1 may be used. If the scaled one is used, it is conceivable to make the temporal distance between the picture B8 and the reference picture of MV1 equal to the temporal distance between the picture B8 and the reference picture of MV2. An example of how to make them equal will be explained with reference to FIG. 6. In FIG. 6, it is assumed that the block A in the picture B8 has the motion vectors MV1 and MV2 and the reference pictures of MV1 and MV2 are the pictures P7 and P4 respectively. In this case, MV1' obtained by scaling MV1 to the picture P4 (that is a vector obtained by quadrupling horizontal and vertical components of MV1 respectively in this example) is used as a predicted vector for the motion vector MV2. Or, it may be scaled using a predetermined value for another method. In addition, the order of MV1 and MV2 for each block may be predetermined by a specified method. For example, MV1 and MV2 may be ordered in descending or ascending order of temporal distances from the current picture to the reference pictures, forward vectors first or backward vectors first, in decoding order, or the like.

In the above example, all of the blocks B~D have motion vectors, but if these blocks are coded as intra blocks or in direct mode, exceptional processing may be performed for them. For example, if one of the blocks B~D is a block of such a type, the motion vectors for that block are considered to be 0 for decoding. If two of them are blocks of such a type, the motion vectors of the remaining block are used as predicted vectors. And if all of the blocks have no motion vector, motion vectors are decoded on the assumption that the predicted vector is 0. This type of processing may also be applied.

The decoded motion vectors are outputted to the motion compensation decoding unit 705 and the motion vector storage unit 706. The motion compensation decoding unit 705 acquires the motion compensation blocks from the frame memory 707 based on the inputted motion vectors. The motion compensation blocks generated as mentioned above are outputted to the addition unit 708. The motion vector storage unit 706 stores the inputted motion vectors. Specifically, the motion vector storage unit 706 stores the motion vectors for the decoded blocks.

The addition unit 708 adds the inputted residual errors and the motion compensation blocks to generate decoded blocks. The generated decoded blocks are outputted to the frame memory 707 via the switch 710. The macroblocks in the picture B8 are decoded in sequence in the manner as mentioned above.

As described above, according to the motion vector decoding method of the present invention, a motion vectors for each current block is decoded by adding a predicted vector which is obtained from motion vectors for previously decoded neighboring blocks and the coded motion vector for the current block. This predicted vector is generated by one of the following processes. When the current block and the neighboring blocks respectively have a plurality of motion vectors pointing the reference pictures in the same direction (forward or backward): (A) the motion vectors which refer to the same picture are selected from among the motion vectors for the neighboring blocks so as to generate the predicted vector (based on the selected motion vectors); (B) the motion vectors for the respective neighboring blocks are ordered in the predetermined order, and the motion vectors of the same order rank are selected from the ordered motion vectors so as to generate the predicted vector (based on the selected motion vectors); and (C) the predicted vector for "the second motion vector" of the current block shall be "the first motion vector", and if "the second motion vector" and "the first motion vector" refer to different pictures, "the first motion vector" is scaled according to the temporal distance between the pictures so as to generate the predicted vector.

More specifically, the motion vector decoding method according to the present invention is a motion vector decoding method for generating a predicted vector for a current block to be decoded and decoding a coded motion vector using the predicted vector, the motion vector decoding method comprising an assigning step that, when at least one block among a plurality of decoded blocks in the neighborhood of the current block has motion vectors which refer to reference pictures in the same direction in a display order, assigns IDs to motion vectors for respective one of the plurality of decoded blocks; and a generating step generates the predicted vector for each of the motion vectors for the current block based on the motion vectors with the same ID among the motion vectors for the plurality of decoded blocks. Here, in the above-mentioned the generating step, the following (a) and (b) can be executed:

(a) in the generating step, the predicted vector is generated based on the motion vectors for the plurality of decoded blocks with the same ID as the ID assigned to the motion vector for the current block.

(b) in the generating step, the predicted vector is generated by associating a candidate predicted vector generated by each ID for the motion vectors with the same ID among the motion vectors for the plurality of decoded blocks with the ID for the motion vector for the current block. The motion vectors for the decoded block are distinguished based on one of descending and ascending orders of temporal distances in the display order from a picture including the current block to the reference pictures referred to by the motion vectors.

Accordingly, the motion vectors which are coded in the method as shown in the first embodiment can be correctly decoded.

In the present embodiment, a motion vector of a current block is decoded using the median of the motion vectors of the three previously decoded neighboring blocks as a predicted vector, but the number of the neighboring blocks may be any other numbers, and the predicted vector may be determined by any other methods. For example, the motion vectors for the block immediately left of the current block may be used for a predicted vector.

For example, if the blocks of 8×8 pixels of the present embodiment and blocks of any other sizes are mixed, the following decoded neighboring blocks B, C and D may be used for the current block A. Specifically, it may be determined that the block B is a block containing a pixel to the left of the upper left pixel in the block A, the block C is a block containing a pixel just above the upper left pixel in the block A and the block D is a block containing a pixel above and to the right of the upper right pixel in the block A.

In the present embodiment, the locations of the previously decoded neighboring blocks for motion vector decoding have been explained with reference to FIGS. 3A~3D, but any other locations may be applied.

In the present embodiment, motion vector is decoded by adding the motion vector of a current block and the predicted vector obtained from the motion vectors for the neighboring blocks, but it may be decoded by other methods than the addition.

In addition, in the present embodiment, the first, second and third methods of generating the predicted vector for motion vector decoding have been respectively explained, but these methods may be used in combination.

For example, if the first and second predicted vector generating methods are combined, the predicted vector can be generated according to the flow as illustrated in FIG. 7. If the second and third predicted vector generating methods are combined, the third method can be executed instead of S115~S118 in FIG. 7.

In the present embodiment, a predicted vector is generated for decoding motion vectors on the assumption that a current block has forward reference motion vectors only, but the predicted vector can be generated in the same manner even if the current block has a backward reference motion vector.

In the present embodiment, the case where the maximum number of reference pictures is 2 has been explained, but it may be 3 or more.

Further, there are the following methods for storing and managing motion vectors in the motion vector storage unit 706 of the present embodiment: (1) motion vectors for neighboring blocks and the order thereof (IDs indicating whether they are the first motion vectors or the second motion vectors) are stored so as to acquire the first or the second motion vector for each neighboring block from the motion vector storage unit 706 using the IDs; and (2) the locations for storing the first motion vector and the second motion vector for each neighboring block are predetermined so as to acquire the first or the second motion vector for the neighboring block from the motion vector storage unit 706 by accessing the storage locations thereof.

In addition, if a program for realizing the structure of the motion vector coding method, the picture coding method including the motion vector coding method, the motion vector decoding method, or the picture decoding method including the motion vector decoding method, as shown in the first and second embodiments, is recorded on a storage medium such as a flexible disk, it becomes possible to perform the processing as shown in these embodiments easily in an independent computer system.

FIGS. 10A, 10B and 10C are illustrate the case where the processing is performed in a computer system using a flexible disk which stores the above-mentioned program.

FIG. 10B illustrates a flexible disk and the front view and the cross-sectional view of the appearance of the flexible disk, and FIG. 10A illustrates an example of a physical format of a flexible disk as a storage medium itself. A flexible disk FD is contained in a case F, a plurality of tracks Tr are formed concentrically on the surface of the disk in the radius direction from the periphery, and each track is divided into 16 sectors Se in the angular direction. Therefore, as for the flexible disk storing the above-mentioned program, the picture coding method as the program is recorded in an area allocated for it on the flexible disk FD.

FIG. 10C illustrates the structure for writing and reading the program on and from the flexible disk FD. When the program is recorded on the flexible disk FD, the computer system Cs writes the picture coding method or the picture decoding method as the program on the flexible disk FD via a flexible disk drive. For constructing the picture coding method in the computer system by the program recorded on the flexible disk, the program is read out from the flexible disk via the flexible disk drive and transferred to the computer system.

The above explanation is made on the assumption that a storage medium is a flexible disk, but the same processing can also be performed using an optical disk. In addition, the storage medium is not limited to a flexible disk and an optical disk, but any other mediums such as an IC card and a ROM cassette can be used if a program can be recorded on them.

FIG. 11~FIG. 14 are illustrate exemplary apparatuses for performing the coding or decoding processing of the first and second embodiments and, and an exemplary system using them.

Figure 11:
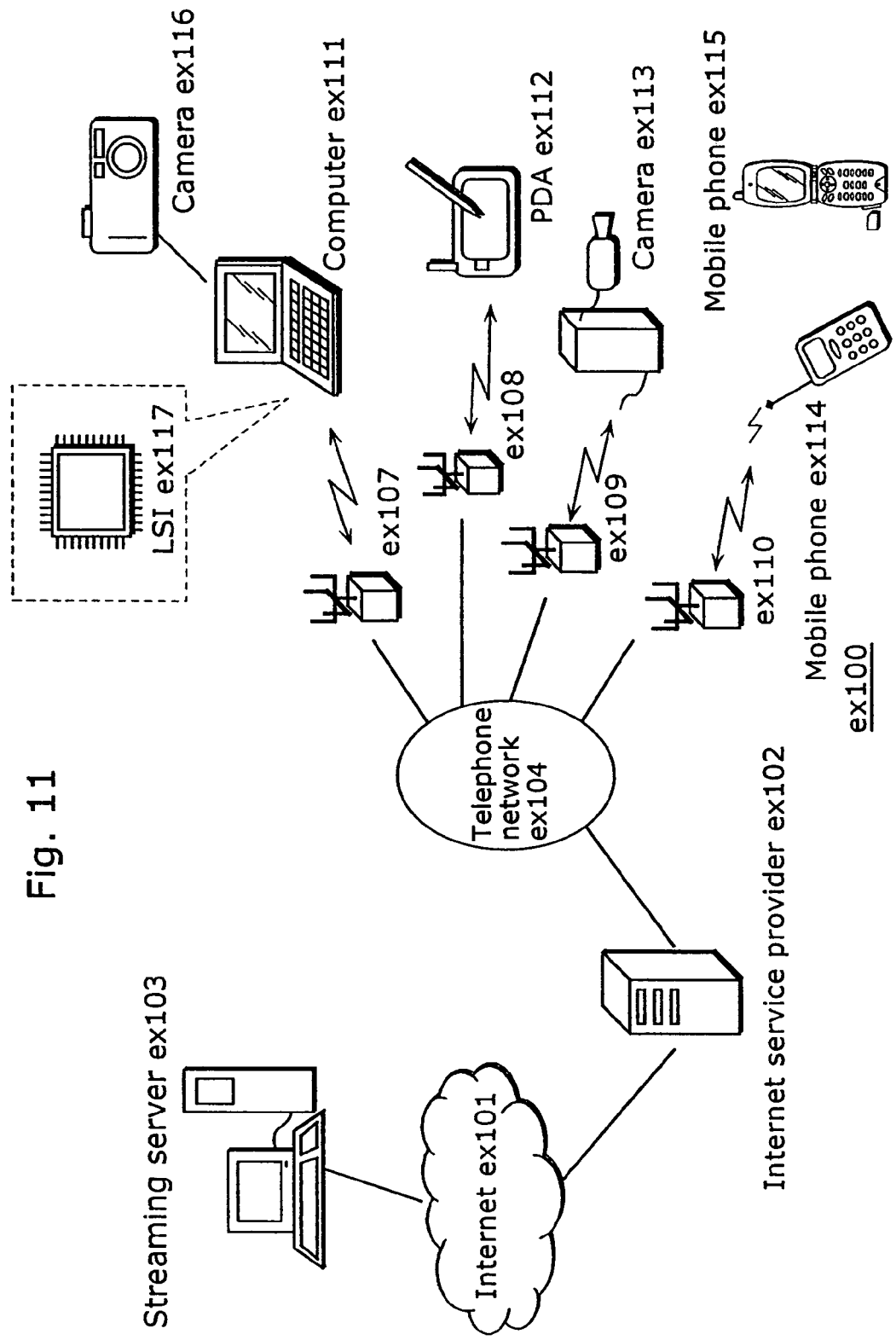
FIG. 11 is a block diagram illustrating the overall configuration of a content providing system.

FIG. 11 is a block diagram illustrating the overall configuration of a content providing system ex100 for realizing content distribution service. The area for providing communication service is divided into cells of desired size, and mobile stations ex107~ex110 which are fixed wireless stations are placed in respective cells.

This content providing system ex100 is connected to apparatuses such as a computer ex111, a PDA (Personal Digital Assistant) ex112, a camera ex113, a mobile phone ex114 and a camera-equipped mobile phone ex115 via the Internet ex101, an Internet service provider ex102, a telephone network ex104 and mobile stations ex107~ex110.

However, the content providing system ex100 is not limited to the configuration as shown in FIG. 11, and may be connected to a combination of any of them. Also, each apparatus may be connected directly to the telephone network ex104, not through the mobile stations ex107~ex110.

The camera ex113 is an apparatus such as a digital video camera capable of shooting moving pictures. The mobile phone may be a mobile phone of a PDC (Personal Digital Communication) system, a CDMA (Code Division Multiple Access) system, a W-CDMA (Wideband-Code Division Multiple Access) system or a GSM (Global System for Mobile Communications) system, a PHS (Personal Handyphone System) or the like.

A streaming server ex103 is connected to the camera ex113 via the telephone network ex104 and the mobile station ex109, which enables live distribution or the like using the camera ex113 based on the coded data transmitted from the user. Either the camera ex113 or the server for transmitting the data may code the data shot by the camera. Also, the moving picture data shot by a camera ex116 may be transmitted to the streaming server ex103 via the computer ex111. The camera ex116 is an apparatus such as a digital camera capable of shooting still and moving pictures. Either the camera ex116 or the computer ex111 may code the moving picture data. An LSI ex117 included in the computer ex111 or the camera ex116 actually performs coding processing. Software for coding and decoding pictures may be integrated into any type of a storage medium (such as a CD-ROM, a flexible disk and a hard disk) which is readable by the computer ex111 or the like. Furthermore, the camera-equipped mobile phone ex115 may transmit the moving picture data. This moving picture data is the data coded by the LSI included in the mobile phone ex115.

In the content providing system ex100, contents (such as a music live video) shot by users using the camera ex113, the camera ex116 or the like are coded in the same manner as the first embodiment and transmitted to the streaming server ex103, while the streaming server ex103 makes stream distribution of the content data to the clients at their request. The clients include the computer ex111, the PDA ex112, the camera ex113, the mobile phone ex114 and so on capable of decoding the above-mentioned coded data. In the content providing system ex100, the clients can thus receive and reproduce the coded data, and further can receive, decode and reproduce the data in real-time so as to realize personal broadcasting.

When each apparatus in this system performs coding or decoding, the moving picture coding apparatus or the moving picture decoding apparatus, as shown in the above-mentioned first or second embodiment, can be used.

A mobile phone will be explained as an example.

Figure 12:
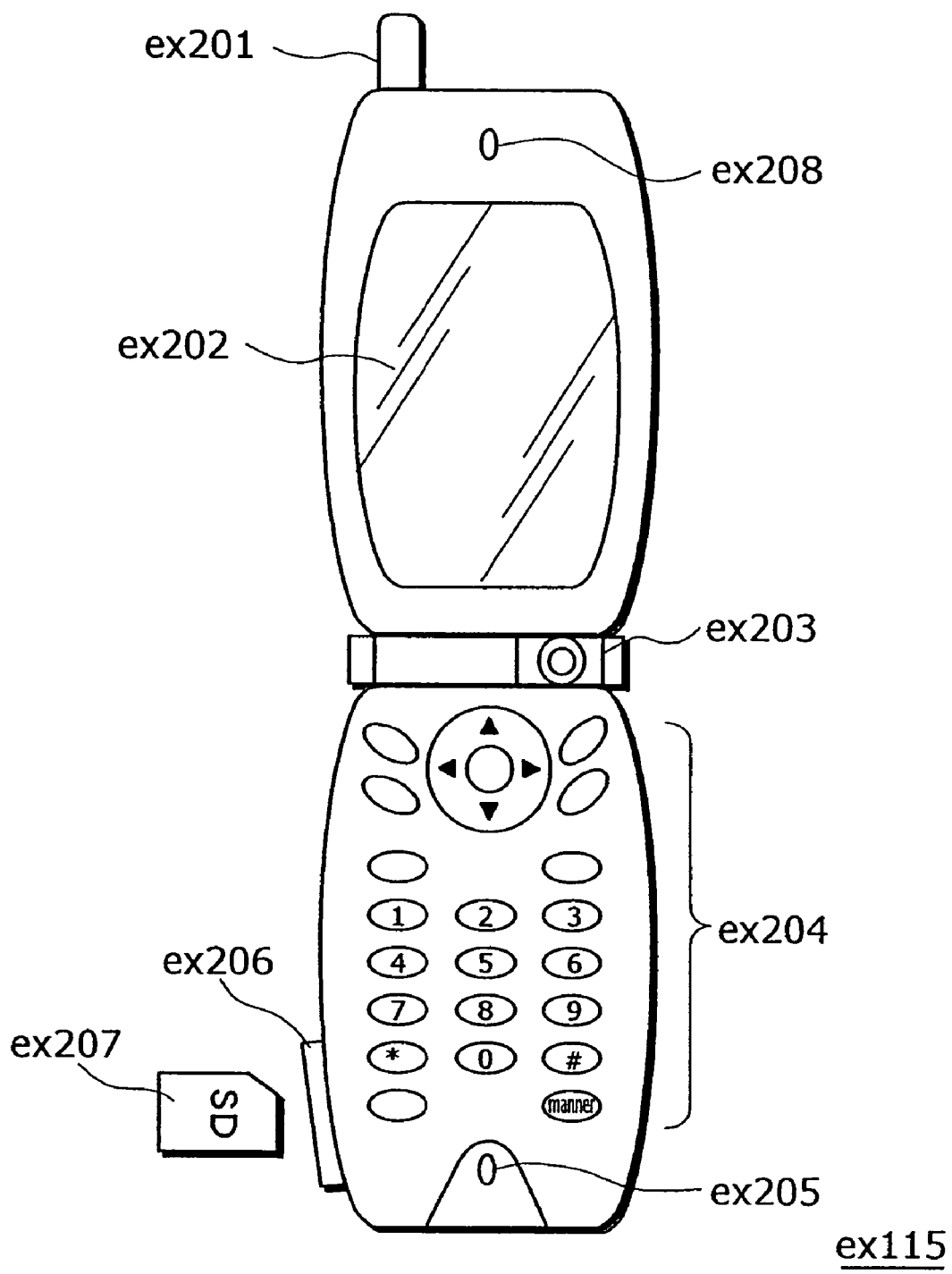
FIG. 12 is a diagram illustrating a mobile phone using a moving picture coding method and a moving picture decoding method.

FIG. 12 is a diagram illustrating the mobile phone ex115 realized using the moving picture coding method and the moving picture decoding method explained in the first and second embodiments. The mobile phone ex115 has an antenna ex201 for sending and receiving radio waves between the mobile station ex110, a camera unit ex203 such as a CCD camera capable of shooting moving and still pictures, a display unit ex202 such as a liquid crystal display for displaying the data obtained by decoding pictures and the like shot by the camera unit ex203 or received by the antenna ex201. A main body includes a set of operation keys ex204, a voice output unit ex208 such as a speaker for outputting voices, a voice input unit 205 such as a microphone for inputting voices, a storage medium ex207 for storing coded or decoded data such as data of moving or still pictures shot by the camera and data of moving or still pictures of received e-mails, and a slot unit ex206 for attaching the storage medium ex207 into the mobile phone ex115. The storage medium ex207 includes a flash memory element, a kind of EEPROM (Electrically Erasable and Programmable Read Only Memory) that is an electrically erasable and rewritable nonvolatile memory, in a plastic case such as an SD card.

Next, the mobile phone ex115 will be explained with reference to FIG. 13. In the mobile phone ex115, a main control unit ex311 for overall controlling each unit of the main body including the display unit ex202 and the operation keys ex204 is connected to a power supply circuit unit ex310, an operation input control unit ex304, a picture coding unit ex312, a camera interface unit ex303, an LCD (Liquid Crystal Display) control unit ex302, a picture decoding unit ex309, a multiplex/demultiplex unit ex308, a read/write unit ex307, a modem circuit unit ex306 and a voice processing unit ex305 to each other via a synchronous bus ex313.

When a call-end key or a power key is turned ON by a user's operation, the power supply circuit unit ex310 supplies respective units with power from a battery pack so as to activate the camera-equipped digital mobile phone ex115 for a ready state.

In the mobile phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing of the digital voice data, and the send/receive circuit unit ex301 performs digital-to-analog conversion and frequency conversion of the data, so as to transmit it via the antenna ex201. Also, in the mobile phone ex115, the send/receive circuit unit ex301 amplifies the data received by the antenna ex201 in conversation mode and performs frequency conversion and analog-to-digital conversion of the data, the modem circuit unit ex306 performs inverse spread spectrum processing of the data, and the voice processing unit ex305 converts it into analog voice data, so as to output it via the voice output unit ex208.

Furthermore, when transmitting an e-mail in data communication mode, the text data of the e-mail inputted by operating the operation keys ex204 on the main body is sent out to the main control unit ex311 via the operation input control unit ex304. In the main control unit ex311, after the modem circuit unit ex306 performs spread spectrum processing of the text data and the send/receive circuit unit ex301 performs digital-to-analog conversion and frequency conversion of it, the data is transmitted to the mobile station ex110 via the antenna ex201.

When picture data is transmitted in data communication mode, the picture data shot by the camera unit ex203 is supplied to the picture coding unit ex312 via the camera interface unit ex303. When it is not transmitted, the picture data shot by the camera unit ex203 can also be displayed directly on the display unit 202 via the camera interface unit ex303 and the LCD control unit ex302.

The picture coding unit ex312, which includes the picture coding apparatus as explained in the present invention, codes the picture data supplied from the camera unit ex203 by the coding method used for the picture coding apparatus as shown in the above-mentioned first embodiment so as to transform it into coded picture data, and sends it out to the multiplex/demultiplex unit ex308. At this time, the mobile phone ex115 sends out the voices received by the voice input unit ex205 during shooting pictures by the camera unit ex203 to the multiplex/demultiplex unit ex308 as digital voice data via the voice processing unit ex305.

The multiplex/demultiplex unit ex308 multiplexes the coded picture data supplied from the picture coding unit ex312 and the voice data supplied from the voice processing unit ex305 by a predetermined method, the modem circuit unit ex306 performs spread spectrum processing of the resulting multiplexed data, and the send/receive circuit unit ex301 performs digital-to-analog conversion and frequency conversion of the data for transmitting via the antenna ex201.

As for receiving data of a moving picture file which is linked to a Web page or the like in data communication mode, the modem circuit unit ex306 performs inverse spread spectrum processing of the data received from the mobile station ex110 via the antenna ex201, and sends out the resulting multiplexed data to the multiplex/demultiplex unit ex308.

In order to decode the multiplexed data received via the antenna ex201, the multiplex/demultiplex unit ex308 demultiplexes the multiplexed data into a bit stream of picture data and a bit stream of voice data, and supplies the coded picture data to the picture decoding unit ex309 and the voice data to the voice processing unit ex305 respectively via the synchronous bus ex313.

Next, the picture decoding unit ex309, which includes the picture decoding apparatus as explained in the present invention, decodes the bit stream of picture data by the decoding method paired with the coding method as shown in the above-mentioned embodiments, so as to generate reproduced moving picture data, and supplies this data to the display unit ex202 via the LCD control unit ex302, and thus picture data included in a moving picture file linked to a Web page, for instance, is displayed. At the same time, the voice processing unit ex305 converts the voice data into analog voice data, and supplies this data to the voice output unit ex208, and thus voice data included in a moving picture file linked to a Web page, for instance, is reproduced.

Figure 14:
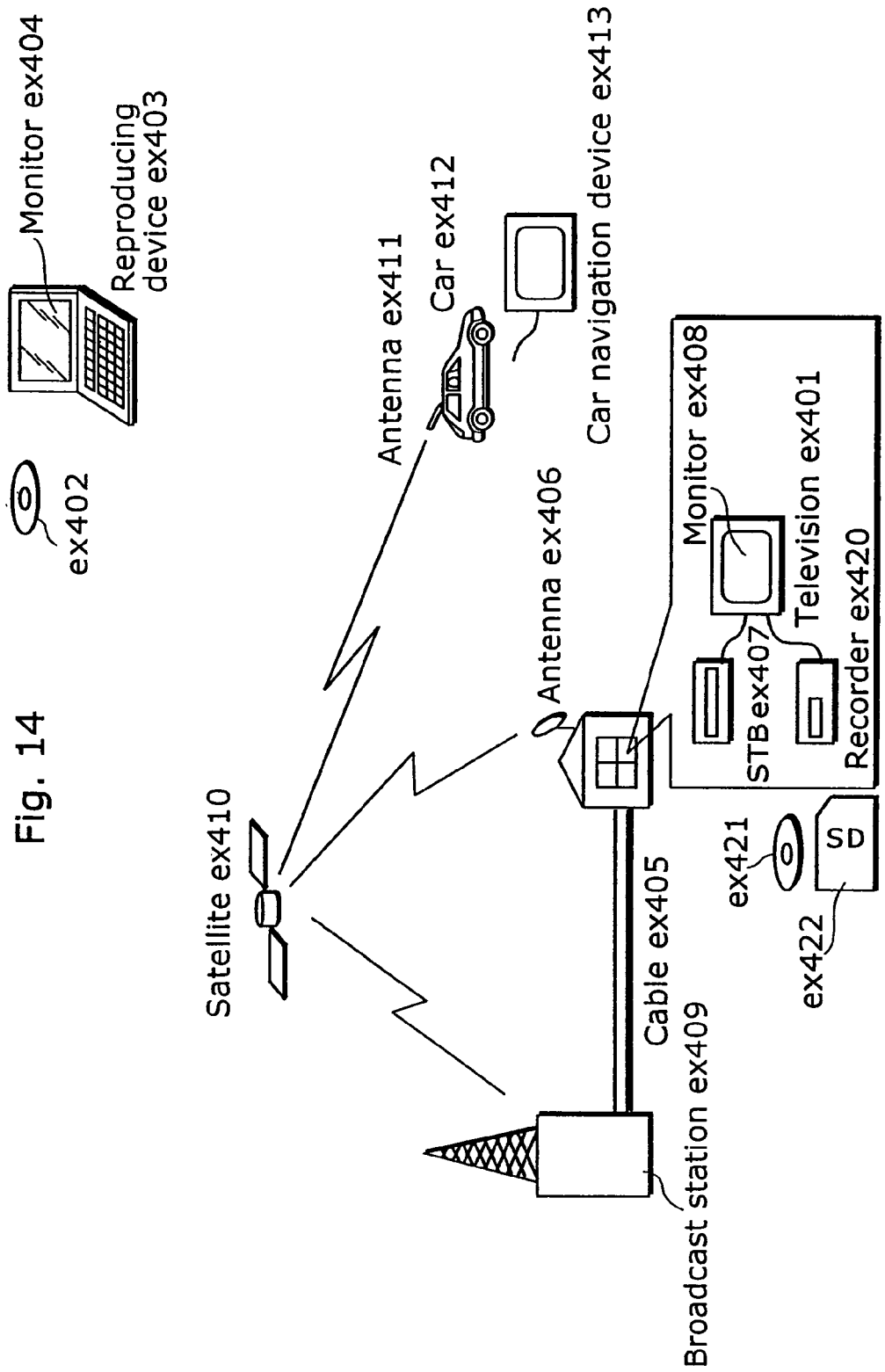
FIG. 14 is a diagram illustrating a digital broadcast system.
Figure 15:
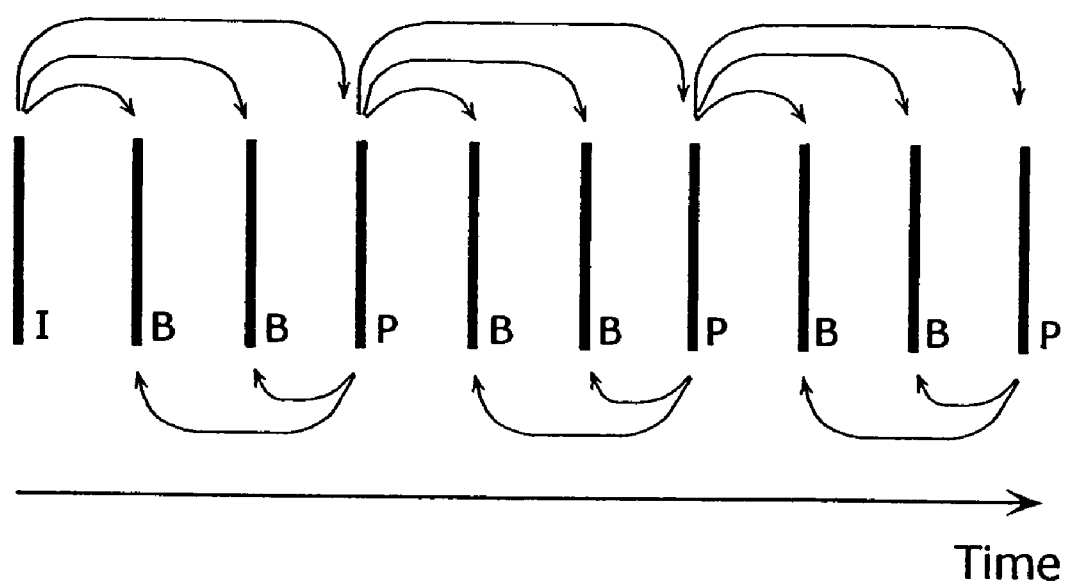
FIG. 15 is a diagram illustrating picture reference relations in the conventional art.
Figure 16A:
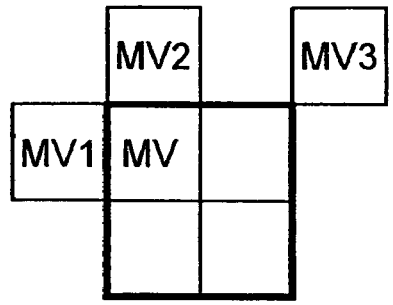
FIG. 16 is a diagram illustrating neighboring blocks used for generating a predicted vector.
Figure 16B:
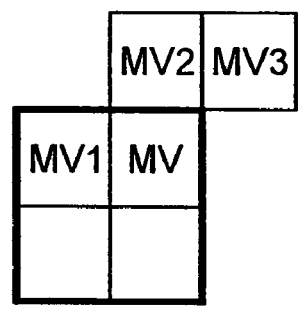
Figure 16C:
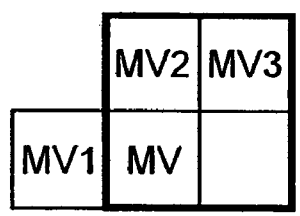
Figure 16D:
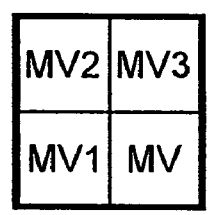

The present invention is not limited to the above-mentioned system, and at least either the picture coding apparatus or the picture decoding apparatus in the above-mentioned embodiments can be incorporated into a digital broadcasting system as shown in FIG. 14. Such ground-based or satellite digital broadcasting has been in the news lately. More specifically, a bit stream of picture information is transmitted from a broadcast station ex409 to or communicated with a broadcast satellite ex410 via radio waves. Upon receipt of it, the broadcast satellite ex410 transmits radio waves for broadcasting, a home antenna ex406 with a satellite broadcast reception function receives the radio waves, and an apparatus such as a television (receiver) ex401 or a set top box (STB) ex407 decodes the bit stream for reproduction. The picture decoding apparatus as shown in the above-mentioned embodiment can be implemented in the reproducing apparatus ex403 for reading the bit stream recorded on a storage medium ex402 such as a CD and DVD and decoding it. In this case, the reproduced picture signals are displayed on a monitor ex404. It is also conceived to implement the picture decoding apparatus in the set top box ex407 connected to a cable ex405 for a cable television or the antenna ex406 for satellite and/or ground-based broadcasting so as to reproduce the picture signals on a monitor ex408 of the television ex401. The picture decoding apparatus may be incorporated into the television, not in the set top box. Or, a car ex412 having an antenna ex411 can receive signals from the satellite ex410 or the mobile station ex107 for reproducing moving pictures on a display apparatus such as a car navigation apparatus ex413 in the car ex412.

Furthermore, the picture coding apparatus as shown in the above-mentioned embodiment can code picture signals for recording on a storage medium. As a concrete example, there is a recorder ex420 such as a DVD recorder for recording picture signals on a DVD disk ex421 and a disk recorder for recording them on a hard disk. They can also be recorded on an SD card (memory card) ex422. If the recorder ex420 includes the picture decoding apparatus as shown in the above-mentioned embodiment, the picture signals recorded on the DVD disk ex421 or the SD card ex422 can be reproduced for display on the monitor ex408.

Figure 13:
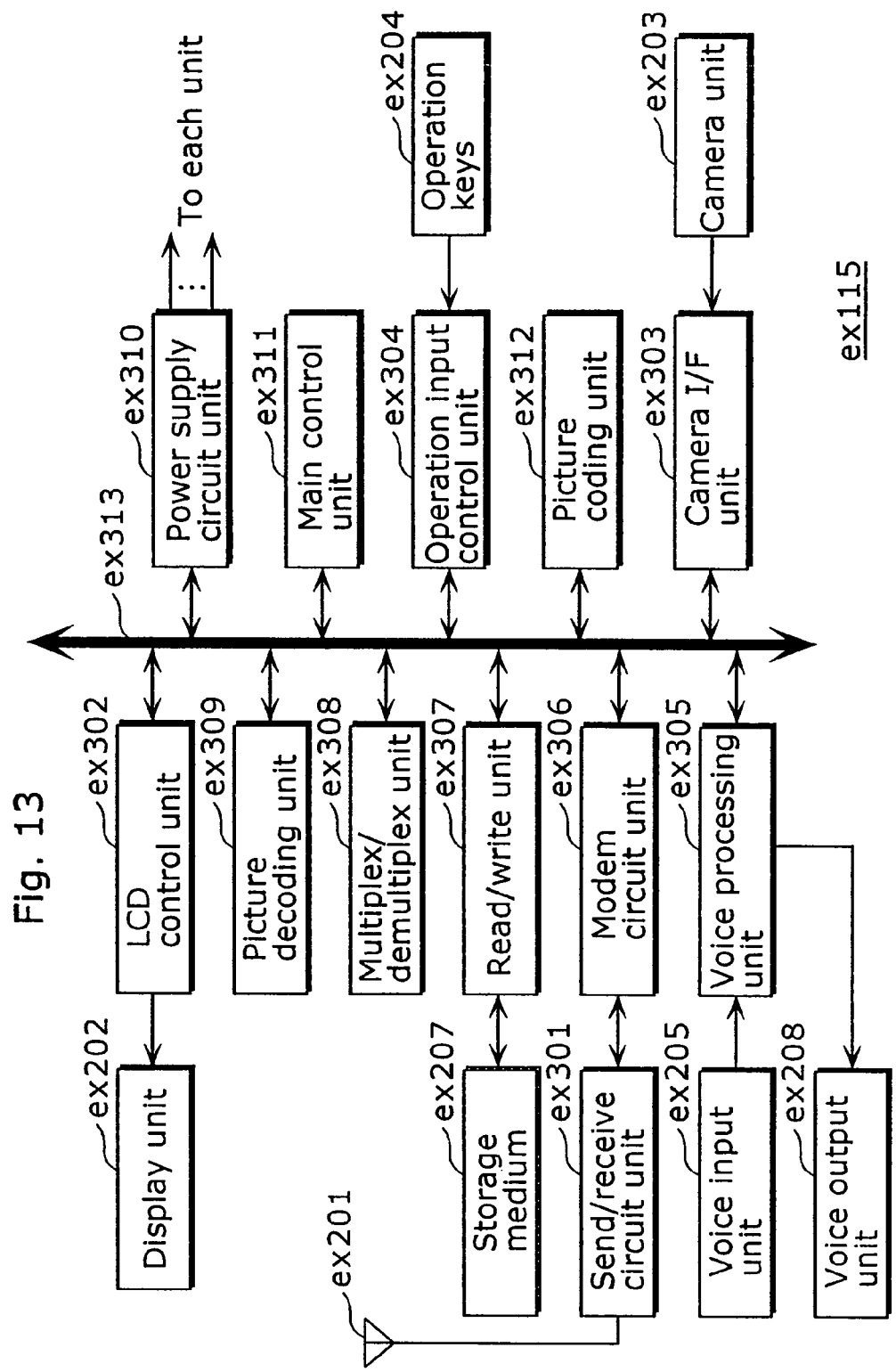
FIG. 13 is a block diagram illustrating the structure of the mobile phone.

As the structure of the car navigation apparatus ex413, the structure without the camera unit ex203, the camera interface unit ex303 and the picture coding unit ex312, out of the units as shown in FIG. 13, is conceivable. The same applies to the computer ex111, the television (receiver) ex401 and others.

In addition, three types of implementations can be conceived for a terminal such as the above-mentioned mobile phone ex114; a sending/receiving terminal equipped with both an encoder and a decoder, a sending terminal equipped with an encoder only, and a receiving terminal equipped with a decoder only.

As described above, it is possible to apply the moving picture coding method or the moving picture decoding method in the above-mentioned embodiments to any of the above apparatuses and systems, and by applying this method, the effects described in the above embodiments can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

The present invention can be applied to a motion vector coding apparatus and a moving picture coding apparatus for generating a motion vector for a current block to be coded and a predicted vector for the motion vector, coding the difference between the motion vector and the predicted vector, and placing the coded difference in a bit stream representing a moving picture. The present invention can also be applied to a motion vector decoding apparatus and a moving picture decoding apparatus for decoding the bit stream.

The invention claimed is:

1. A motion vector coding method, comprising:
   an assigning step for assigning, when at least one block among a plurality of coded blocks in the neighborhood of a current block has two motion vectors which refer to reference pictures in the same direction in a display order, an identifier to each motion vector for respective one of the plurality of coded blocks;
   a generating step for generating a predicted motion vector for a motion vector of the current block based on the motion vectors with the same identifier among the motion vectors for the plurality of coded blocks; and
   a coding step for coding a difference between the motion vector of the current block and the predicted motion vector.

2. The motion vector coding method according to claim 1, wherein in the assigning step, the identifier is further assigned to the motion vector of the current block, and
   in the generating step, the predicted motion vector is generated based on the motion vectors with the same identifier as the identifier assigned to the motion vector for the current block.

3. The motion vector coding method according to claim 2, wherein in the assigning step, the identifier is assigned to the each motion vector for respective one of the plurality of coded blocks based on an order in a bit stream where each of the motion vectors is placed as the coded difference.

* * * * *